(12) United States Patent
Hood et al.

(10) Patent No.: US 10,535,022 B1
(45) Date of Patent: Jan. 14, 2020

(54) SUSTAINABLE BUSINESS DEVELOPMENT MANAGEMENT SYSTEM AND METHOD

(75) Inventors: Alastair Hood, San Francisco, CA (US); Michael Martinelli, San Francisco, CA (US)

(73) Assignee: VERDAFERO, INC., San Francisco, CA (US)

( * ) Notice: Subject to any disclaimer, the term of this patent is extended or adjusted under 35 U.S.C. 154(b) by 0 days.

(21) Appl. No.: 13/548,089

(22) Filed: Jul. 12, 2012

Related U.S. Application Data

(60) Provisional application No. 61/507,569, filed on Jul. 13, 2011.

(51) Int. Cl.
*G06Q 10/06* (2012.01)
*G06Q 30/02* (2012.01)

(52) U.S. Cl.
CPC ....... *G06Q 10/0631* (2013.01); *G06Q 10/063* (2013.01); *G06Q 10/0637* (2013.01); *G06Q 30/02* (2013.01); *Y04S 20/20* (2013.01)

(58) Field of Classification Search
CPC ............ G06Q 10/063; G06Q 10/0631; G06Q 10/0637; G06Q 10/06343; G06Q 10/067; G06Q 30/02; Y04S 20/20
See application file for complete search history.

(56) References Cited

U.S. PATENT DOCUMENTS

| | | | | |
|---|---|---|---|---|
| 8,311,863 B1* | 11/2012 | Kemp | ................ | G06Q 10/0639 705/7.11 |
| 10,096,033 B2* | 10/2018 | Heath | ................ | G06Q 30/02 |
| 2004/0039684 A1* | 2/2004 | Sandor | ................ | G06Q 10/10 705/37 |
| 2005/0049904 A1* | 3/2005 | Von Biedermann | ............. | 705/7 |
| 2005/0246190 A1* | 11/2005 | Sandor | ................ | G06Q 40/04 705/37 |
| 2007/0192221 A1* | 8/2007 | Sandor | ................ | G06Q 40/02 705/35 |
| 2007/0203722 A1* | 8/2007 | Richards | ............... | G06Q 99/00 705/7.37 |
| 2008/0097811 A1* | 4/2008 | Kramer et al. | .................... | 705/8 |
| 2009/0043653 A1* | 2/2009 | Sandor | .............. | G06Q 30/0242 705/14.41 |
| 2009/0132649 A1* | 5/2009 | Hubbard | ...................... | 709/203 |
| 2009/0281677 A1* | 11/2009 | Botich | ................... | G06Q 10/00 700/295 |
| 2010/0030799 A1* | 2/2010 | Parker | .................... | G06Q 40/06 705/37 |

(Continued)

OTHER PUBLICATIONS

Hall, Richard, 1993, A Framework Linking Resources and Capabilities to Sustainable Competitive Advantage, Strategic Management Journal, vol. 14, No. 8, pp. 607-618.*

(Continued)

*Primary Examiner* — Matthew S Gart
*Assistant Examiner* — Stephen S Swartz
(74) *Attorney, Agent, or Firm* — DLA Piper LLP (US)

(57) ABSTRACT

A sustainable business development management system and method are provided for businesses which provides these businesses with a comprehensive understanding of their sustainability goals, projects, and metrics including the environmental and societal impacts of their business with the ability to manage and report on these parameters in a way that makes sense for their business.

17 Claims, 43 Drawing Sheets

(56) References Cited

U.S. PATENT DOCUMENTS

| | | | |
|---|---|---|---|
| 2010/0223101 A1* | 9/2010 | Montague | G06Q 10/06 705/7.36 |
| 2011/0047035 A1* | 2/2011 | Gidwani | G06Q 30/02 705/14.73 |
| 2011/0218885 A1* | 9/2011 | Manski | G06Q 30/0282 705/27.1 |
| 2012/0166583 A1* | 6/2012 | Koonce et al. | 709/217 |
| 2012/0209663 A1* | 8/2012 | Gaskins, Jr. | G06Q 10/063 705/7.36 |
| 2014/0172678 A1* | 6/2014 | Stephens | G06Q 10/0637 705/38 |

OTHER PUBLICATIONS

Christmann, Petra, 2000, Effects of "Best Practices" of Environmental Management on Cost Advantage: The Role of Complementary Assets, The Academy of Management Journal, vol. 43, No. 4, pp. 663-680.*

Fiskel Diane Guyse, 2002, Toward a Sustainable Cement Industry; Substudy 3: Business Case Development, Battelle and World Business Council for Sustainable Development, pp. i-D-4.*

"Green Point Sales and Promotional Agreement" (hereafter Greening Point) web archive image date Feb. of 2010 which is noted as being provided on Sep. 20, 2009.*

* cited by examiner

| METER NUMBER | SP7345 | | | | METER |
|---|---|---|---|---|---|
| START DATE | END DATE | USAGE | UNITS | SPEND | METER |
| 1/1/2009 | 1/6/2009 | 1903 | KWH | 263 | SP7345 |
| 1/7/2009 | 2/5/2009 | 4663 | KWH | 5684 | SP7345 |
| 3/10/2009 | 4/8/2009 | 3942 | KWH | 5599 | SP7345 |
| 4/9/2009 | 5/7/2009 | 3579 | KWH | 5602 | SP7345 |
| 5/8/2009 | 6/8/2009 | 3737 | KWH | 5619 | SP7345 |
| 6/9/2009 | 7/9/2009 | 3827 | KWH | 5795 | SP7345 |
| 7/10/2009 | 8/6/2009 | 3291 | KWH | 5721 | SP7345 |
| 8/7/2009 | 9/4/2009 | 3580 | KWH | 5784 | SP7345 |
| 9/5/2009 | 10/6/2009 | 2490 | KWH | 5651 | SP7345 |
| 10/7/2009 | 11/4/2009 | 2392 | KWH | 5507 | SP7345 |
| 11/5/2009 | 12/7/2009 | 2647 | KWH | 409 | SP7345 |

SUSTAINABLE BUSINESS DEVELOPMENT MANAGEMENT SYSTEM AND METHOD

PRIORITY CLAIMS/RELATED APPLICATIONS

This application claims the benefit under 35 USC 119(e) to U.S. Provisional Patent Application Ser. No. 61/507,569, filed on Jul. 13, 2011 and entitled "Sustainable Business Development Management System and Method", the entirety of which is incorporated herein by reference.

APPENDIX A

Appendix A (4 pages) is an example of a sustainability report generated by the sustainable business development management system. Appendix A forms part of the specification.

FIELD

The disclosure relates generally to a system and method for managing sustainable business goals and in particular to a system and method for managing sustainable business development.

BACKGROUND

It is desirable to be able to manage sustainable business goals of a business. Today, the most prevalent system is the wide spread attempted use of an individual person tracking their metrics in spreadsheets and email, presentations and documents to display and report their sustainable business goal findings. This technique is prone to errors and misunderstanding and can quickly become complicated and unmanageable.

Other competitive systems include only software tracking modules covering energy, water, sometimes waste and carbon management. These systems have been less successful due to the limited uptake and adoption of full carbon trading in the USA and the limited use to businesses as the only cover two to three areas.

In addition, there have been attempts by accounting software manufacturers to address this problem by scanning the buying records of a business and attempting to assign a carbon value to an item. At best, the assigned value can only be a guess value to the items carbon value and at worst is misleading. These systems offer limited value to the end user and have had limited uptake and appeal.

Thus, it is desirable to provide a sustainable business development management system and method that overcomes the limitations of current systems and method above, and it is to this end that the disclosure is directed.

BRIEF DESCRIPTION OF THE DRAWINGS

FIGS. 3A and 3B illustrate examples of the output data of the sustainable business development management system;

FIGS. 9A-9B illustrate an example of a company main sustainability dashboard user interface of the sustainable business development management system;

FIGS. 10A-10C illustrate an example of energy sustainability user interfaces of the sustainable business development management system;

FIGS. 12A-12D illustrate an example of water sustainability user interfaces of the sustainable business development management system;

FIG. 14 illustrates an example of a projects summary user interface of the sustainable business development management system;

FIGS. 15A-E are examples of a sustainability dashboard generated by the sustainable business development management system.

Detailed Description of One or More Embodiments

The disclosure is particularly applicable to a web-based system that implements the sustainable business development management system and method and it is in this context that the disclosure will be described. It will be appreciated, however, that the system and method has greater utility since it can be implemented in other manners/ using different architectures, and may be used for other purposes that those specifically described below for the specific implementation.

A sustainable business development management system and method is provided for businesses which provides these businesses with a comprehensive understanding of their sustainability goals, projects, and metrics including the environmental and societal impacts of their business with the ability to manage and report on these parameters in a way that makes sense for their business. The system may include automated data entry from sustainability related service providers such as energy, water, waste, air travel, etc., powerful sustainability metrics consumption and mitigation analysis processes, TCP/IP communications capabilities, a World Wide Web (WWW)-based interface with a Software as a Service (SaaS) architecture, and a Application Programming Interface (API) to enable e-commerce, reverse online auction, and other value added services. The system also includes a real-time data retrieval and dissemination process and system which permits real-time sustainability data to be communicated within the system. The sustainable business development management system has a decision engine that has a decision sorting mechanism and action planner to give the user real-world actions and recommendations both qualitative and quantitative for the optimum output.

Figure 1:
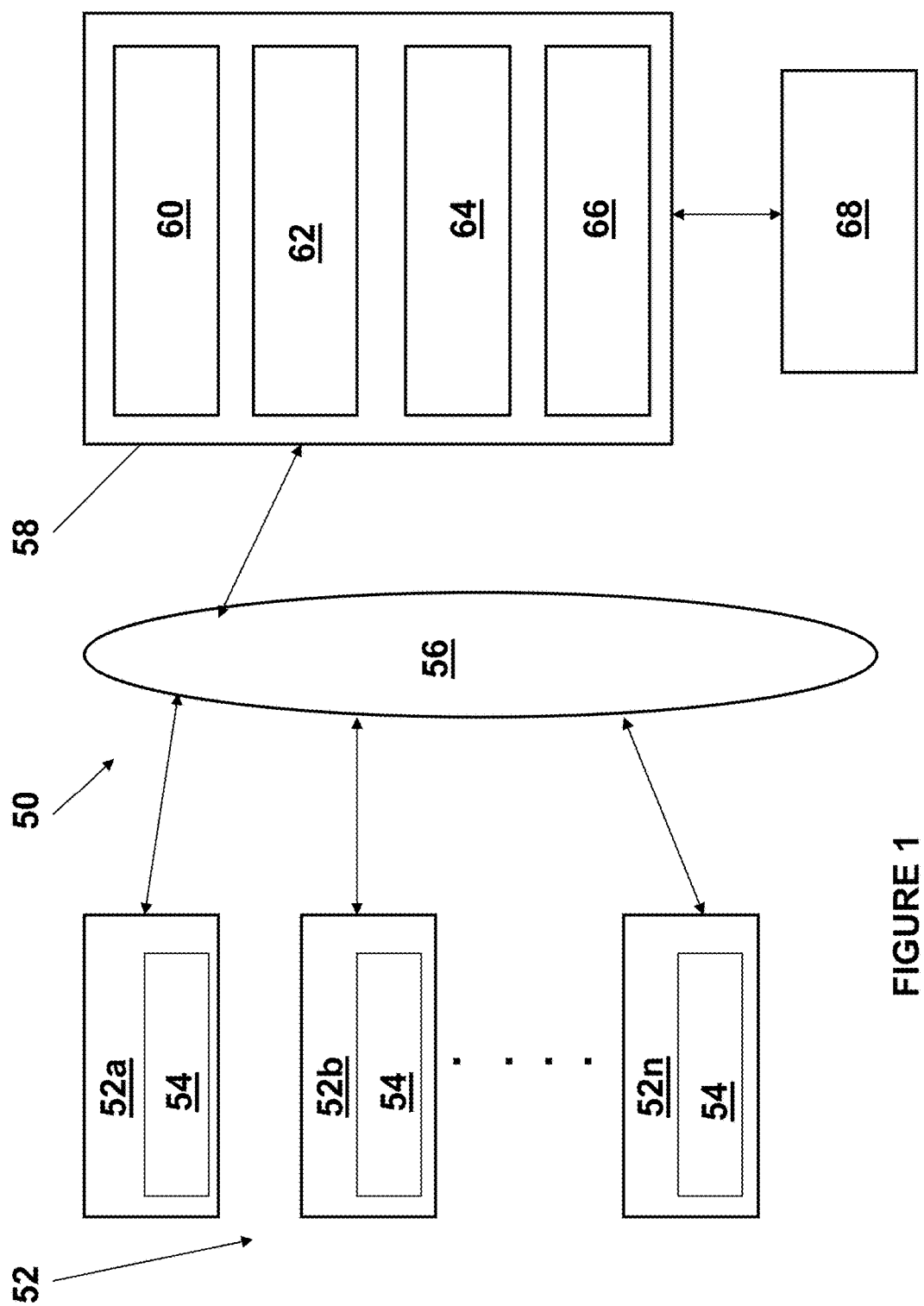
FIG. 1 is a block diagram of an implementation of the sustainable business development management system.

FIG. 1 is a block diagram of an implementation of the sustainable business development management system 50. The system 50 may have one or more computing devices 52, such as computing devices 52a, 52b, . . . 52n as shown in FIG. 1) that establish contact with, communicate with and exchange data with a sustainable business development management unit 58 over a link 56. Each computing device 52 may be a device with one or more processing unit(s), memory, storage, wireless or wired connectivity capabilities and a display sufficient to permit the computing device 52 to interact with the sustainable business development management unit 58 as described below. For example, each computing device 52 may be a desktop computer, a laptop computer, a tablet computer, a smartphone (Apple Iphone, RIM Blackberry, phones that run the Android operating system), a terminal and the like since the implementation of the system is not limited to any particular computing device. In one implementation, each computing device 52 may have a browser 54 that allows the user of the computing device to interact with the sustainable business development management unit 58 as described below. In other implementations, the processing unit on each computing device 52 may execute a web browser application or a small downloadable application that can be stored on the computing device and then executed by the processing unit. The link 56 may be a digital data link, that may be wired or wireless, and may be digital cellular network or a computer network since the implementation of the system is not limited to any particular link.

The sustainable business development management unit 58 may be, in one embodiment, one or more server computers that execute a plurality of line of computer code to implement the functions and operations of the sustainable business development management unit 58 as described below. The sustainable business development management unit 58 may also be implemented in hardware or a combination of hardware and software. In one implementation, the sustainable business development management unit 58 may utilize, for example, a LAMP stack software bundle or other implementation that allows multiple computing devices in the client environment to be connected to a PHP/MySQL managed database and website user interface (commonly referred to as a Software as a Service, or SaaS). The sustainable business development management unit 58 also may be implemented in a standalone computer system architecture, a mainframe type architecture, a downloadable application architecture and the like since the system is not limited to any particular architecture implementation.

In the implementation shown in FIG. 1, the sustainable business development management unit 58 may further comprise a web server 60 (that may be software or hardware) that coordinates interactions with the computing devices, receives data from the computing devices and generates outputs, such as web pages, that are delivered to each computing device as needed, a management unit 64 that manages the overall operation of the sustainable business development management unit 58, controls the web server 60, manages the user data and manages a sustainable business development analysis unit 66. The sustainable business development management unit 58 may be coupled to a store 68, such as one or more databases for example, that stores the user data of the system, stored sustainability projects, the analyzed data and the like. The units 60-66 and store 68 may be implemented in hardware or software.

Figure 2:
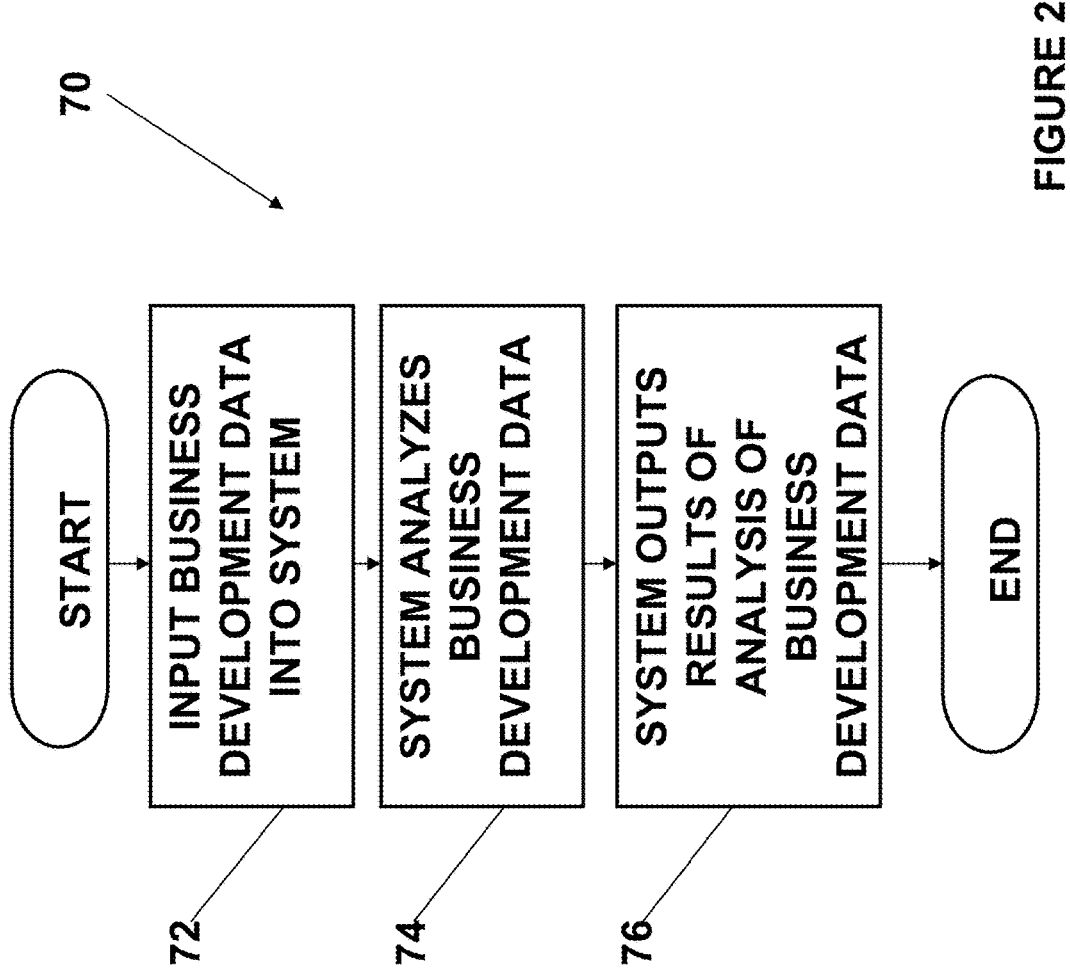
FIG. 2 is a flowchart of a method for sustainable business development management using, for example, the system in FIG. 1.

FIG. 2 is a flowchart of a method 70 for sustainable business development management using, for example, the system in FIG. 1 for each user of the system when the user wants to receive an output from the system. In general, the system captures user profile data about sustainable business development (including, but not limited to business size and scope, strategic goals, consumption data, etc.) and implements a process to provide recommended best practices and products and services to optimize the sustainability performance of the organization with associated tracking and reporting mechanisms at all stages. The system may also provide a marketplace for vendors/suppliers of materials/services for the sustainability performance of the organization.

In the method, a user enters sustainable business development data into the system (72). During the data input process 72, the system may query to user about the one or more desired outputs of the system (such as a particular chart to show a particular sustainability aspect such as energy usage) and the system may then request data from the user about the desired outputs wherein the requested data may include qualitative data and quantitative data. In addition to the user physically entering data into the system, the system also is capable of other input methods including file imports, an API to receive data from other systems, billing systems and the like.

Once the data has been input, the system may perform data analysis (74). During the data analysis, the system may, for example, serve projects stored in the system to the user via his/her computing device and also provide ecommerce connections to the appropriate products/services being displayed to the user in the projects. The system may also perform a data output process (76) in which the system generates the desired outputs for the particular user. The data output may include system reports on the appropriate metrics (based on the user's desired outputs). The system may have an application programming interface (API) that allows the system (and the data outputs of the system) to be broadly adopted/used by other systems that can interface with the sustainable business development management system 50.

Figure 3A:
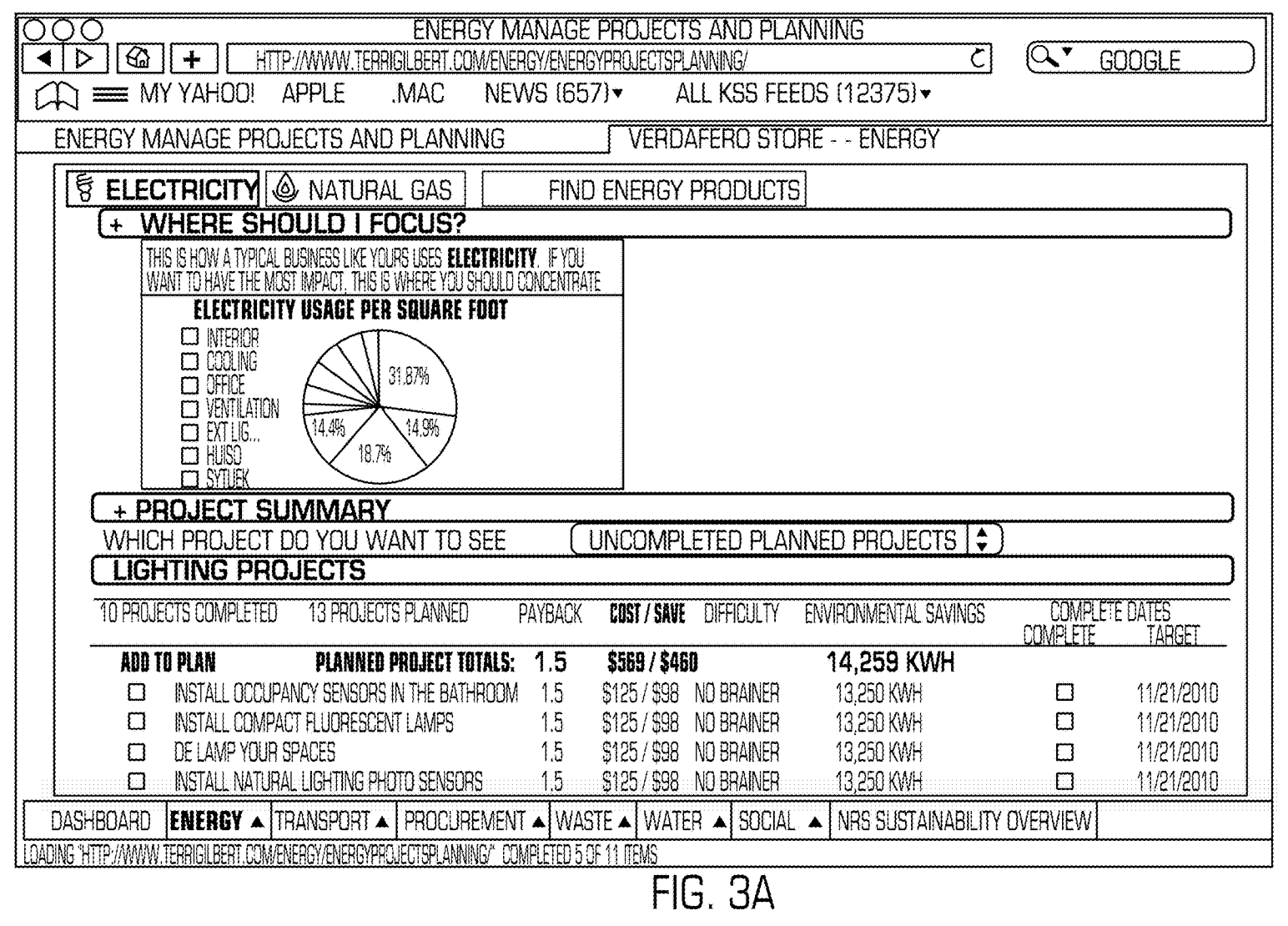

FIGS. 3A and 3B illustrate examples of the output data of the sustainable business development management system. FIG. 3A illustrates a data output (shown as a web page in this example) in which the system is displaying suggested lighting projects for a specific customer. The system also may show a variety of other outputs including the main dashboard, a sustainability report, a carbon footprint, recommended products, etc. FIG. 3B illustrates a data output (shown as a web page in this example) in which the system is displaying quantitative data input for electricity consumption. The system also may display waste, water, etc. as well as some qualitative input (e.g., type of business, goal, etc.).

Figure 4:
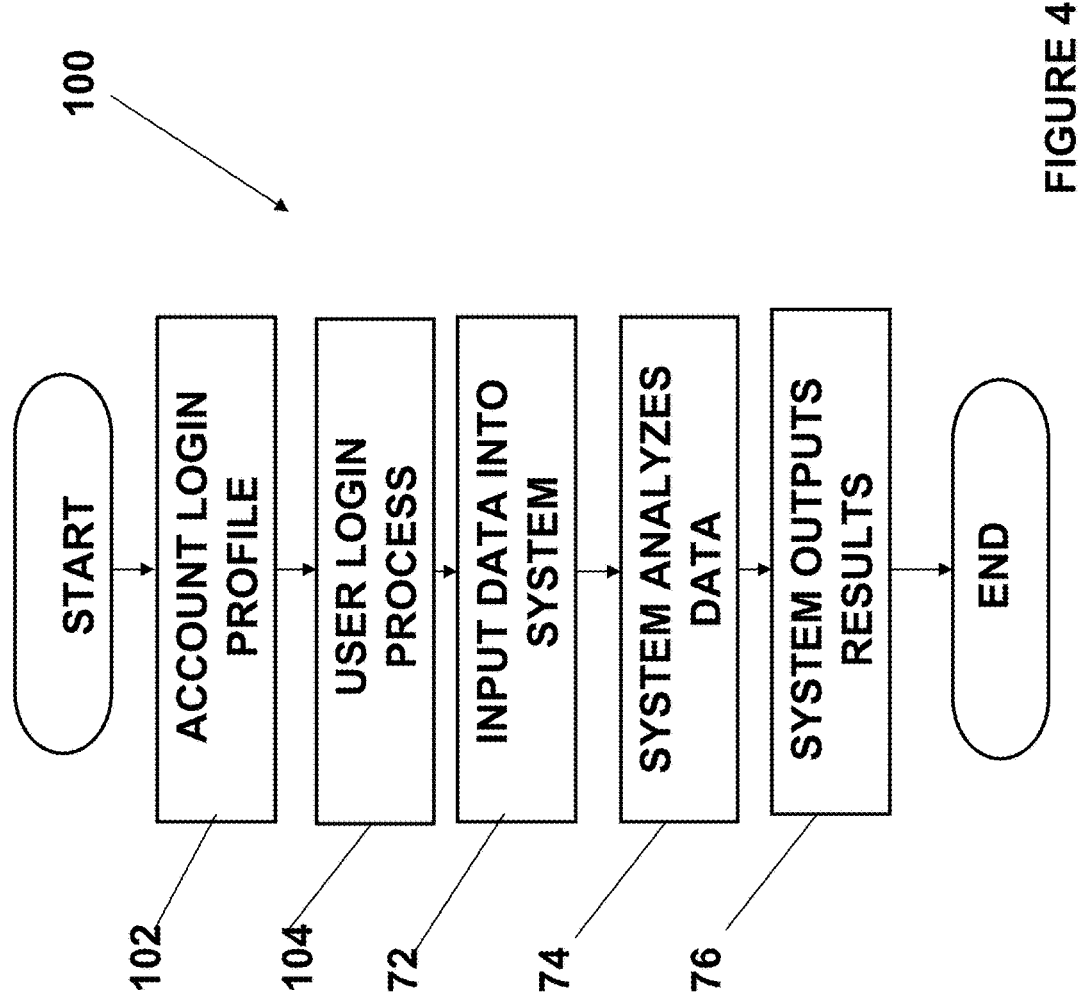
FIG. 4 is a flowchart illustrating more details of a method for sustainable business development management using, for example, the system in FIG. 1.

FIG. 4 is a flowchart illustrating more details of a method 100 for sustainable business development management using, for example, the system in FIG. 1 that incorporates the processes 72-76 described above with more details. The processes described below may be carried out by the system shown in FIG. 1, using web pages, forms and the like. The user provides account login details (102) in which the user, who wants to become a user/member of the sustainable business development management system, provides/inputs basic profile information, including, for example, business name, geographic location of business, industry, # employees, etc. Once the user has provided the basic profile information, the user can login to the system (104) over a link using the computing device in which the computing device interacts with the web server of the unit. In an example implementation of the system, the system may be known as MyVerdafero which is a trademark of the owner of this patent application. The login may be done in a typical manner, securely, using appropriate SSL and/or other security standards.

Figure 5A:
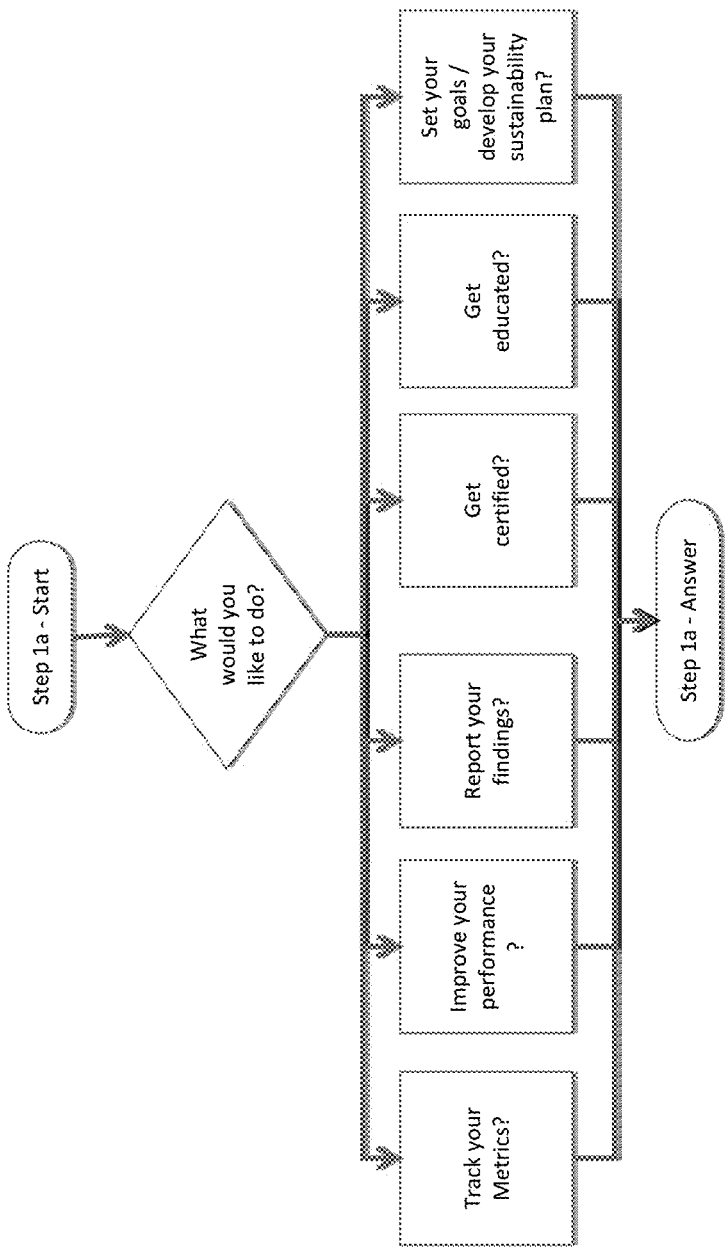
FIGS. 5A-5H illustrate more details of the data input process that is part of the method for sustainable business development management.
Figure 5B:
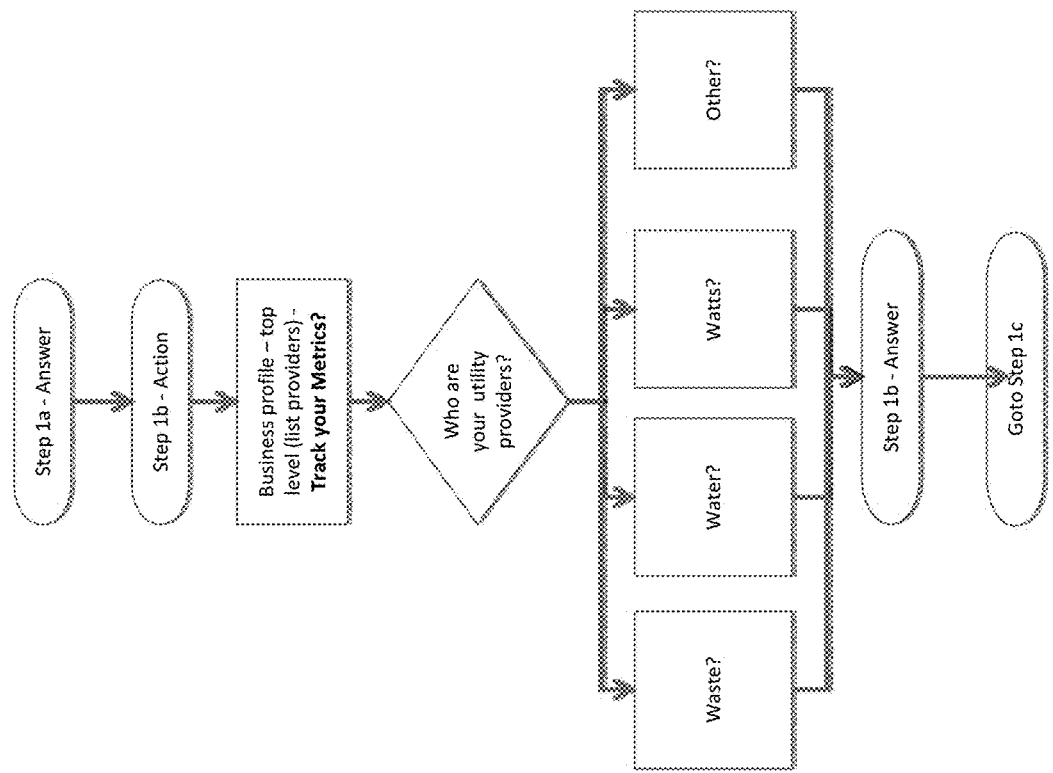
Figure 5C:
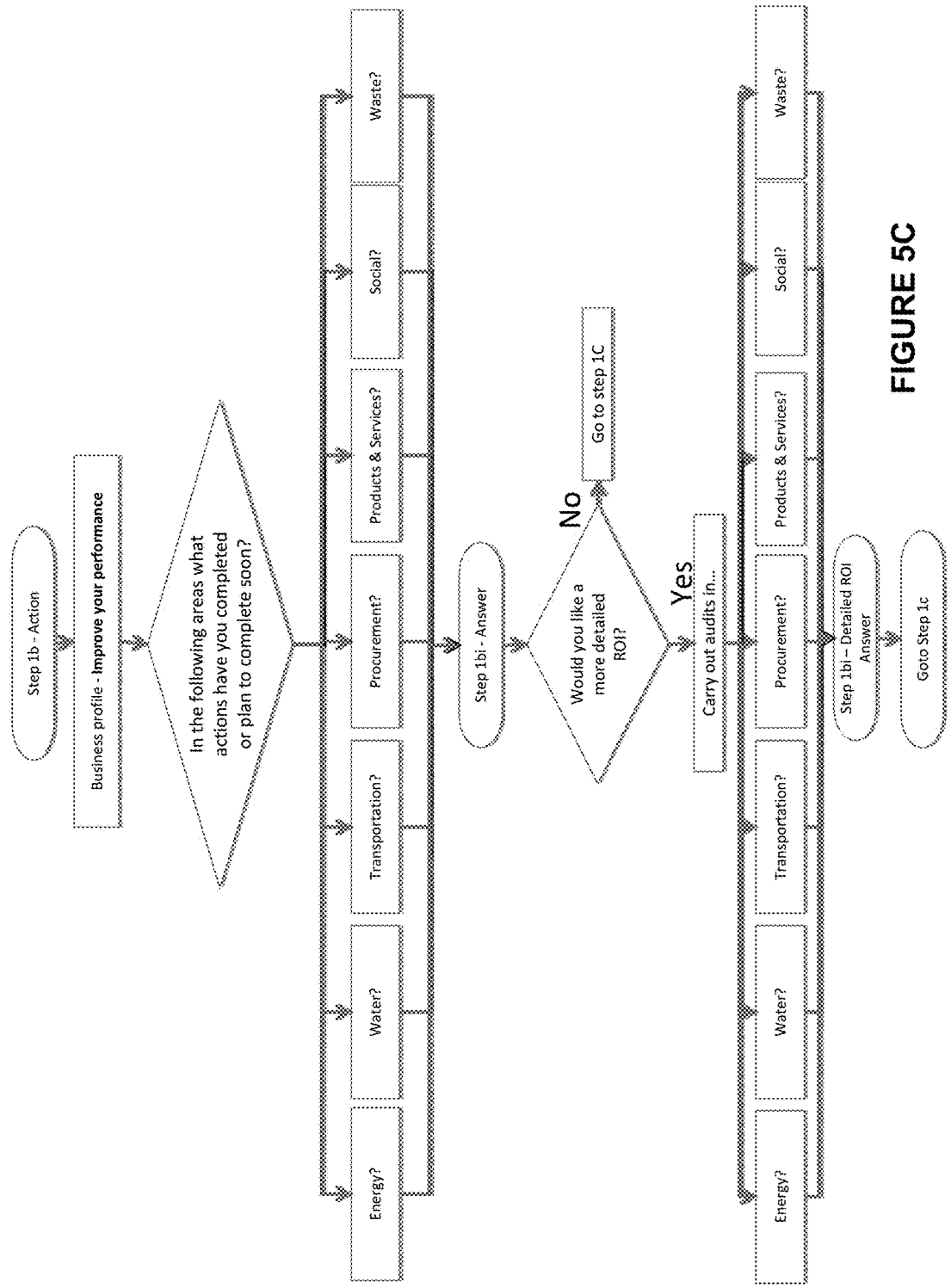
Figure 5D:
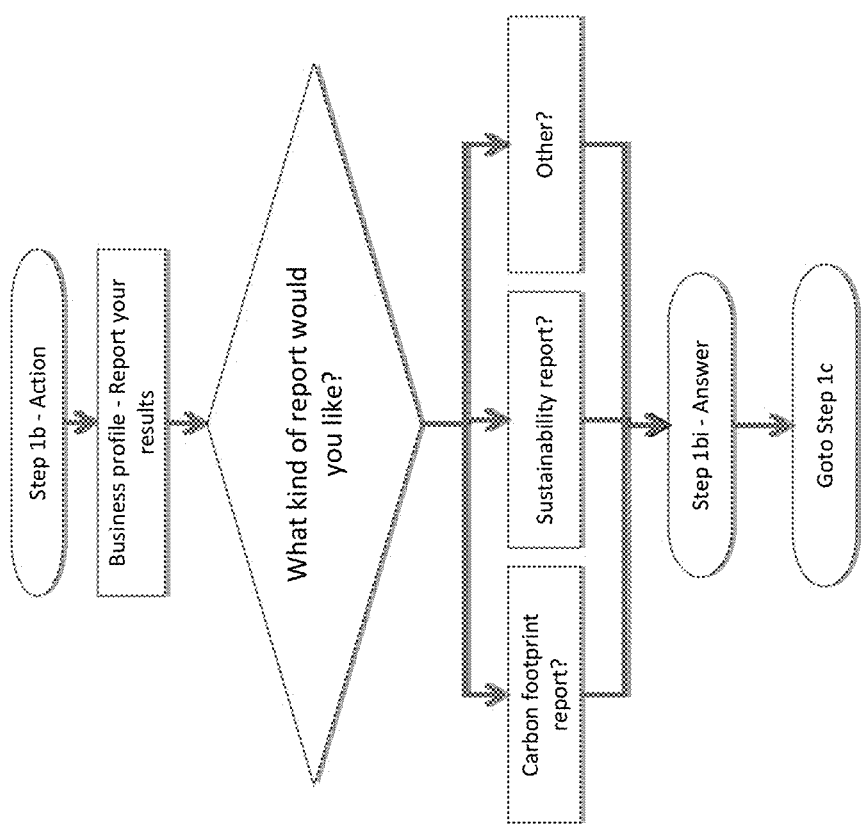
Figure 5E:
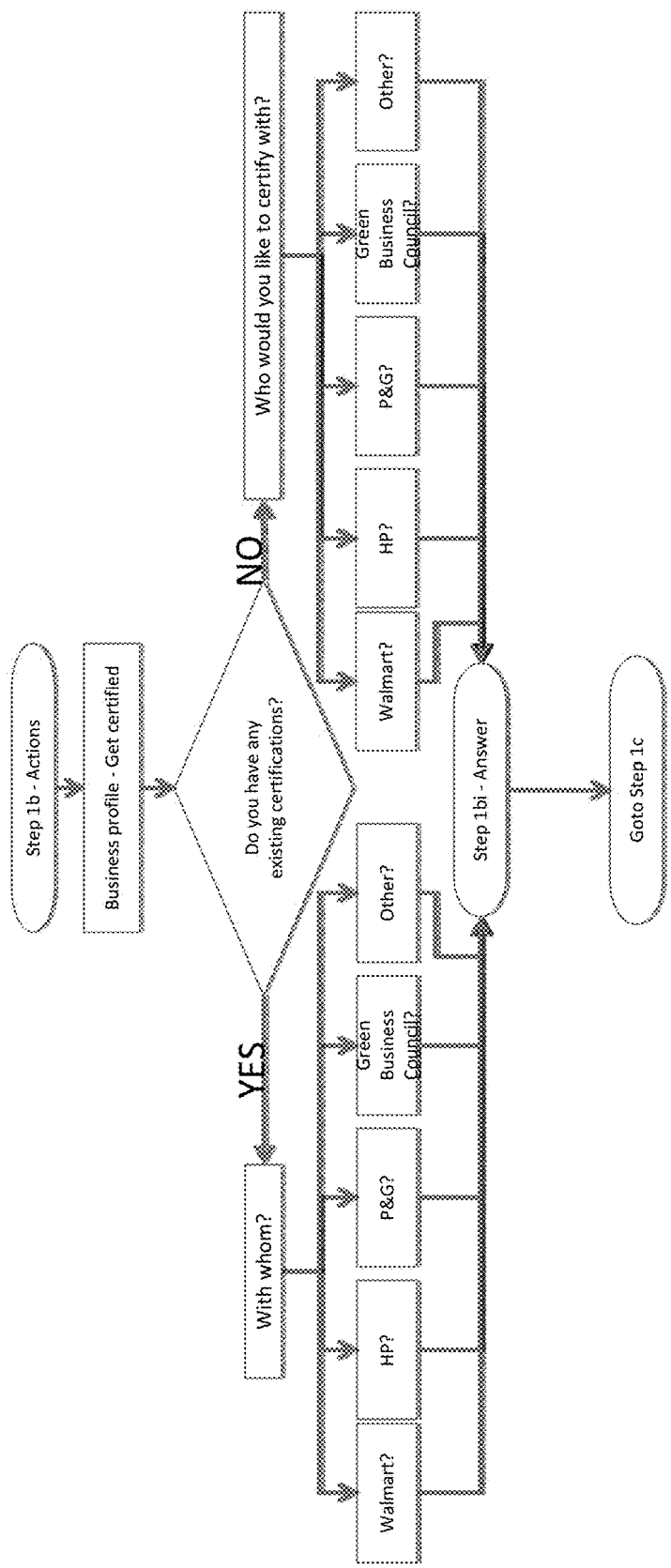
Figure 5F:
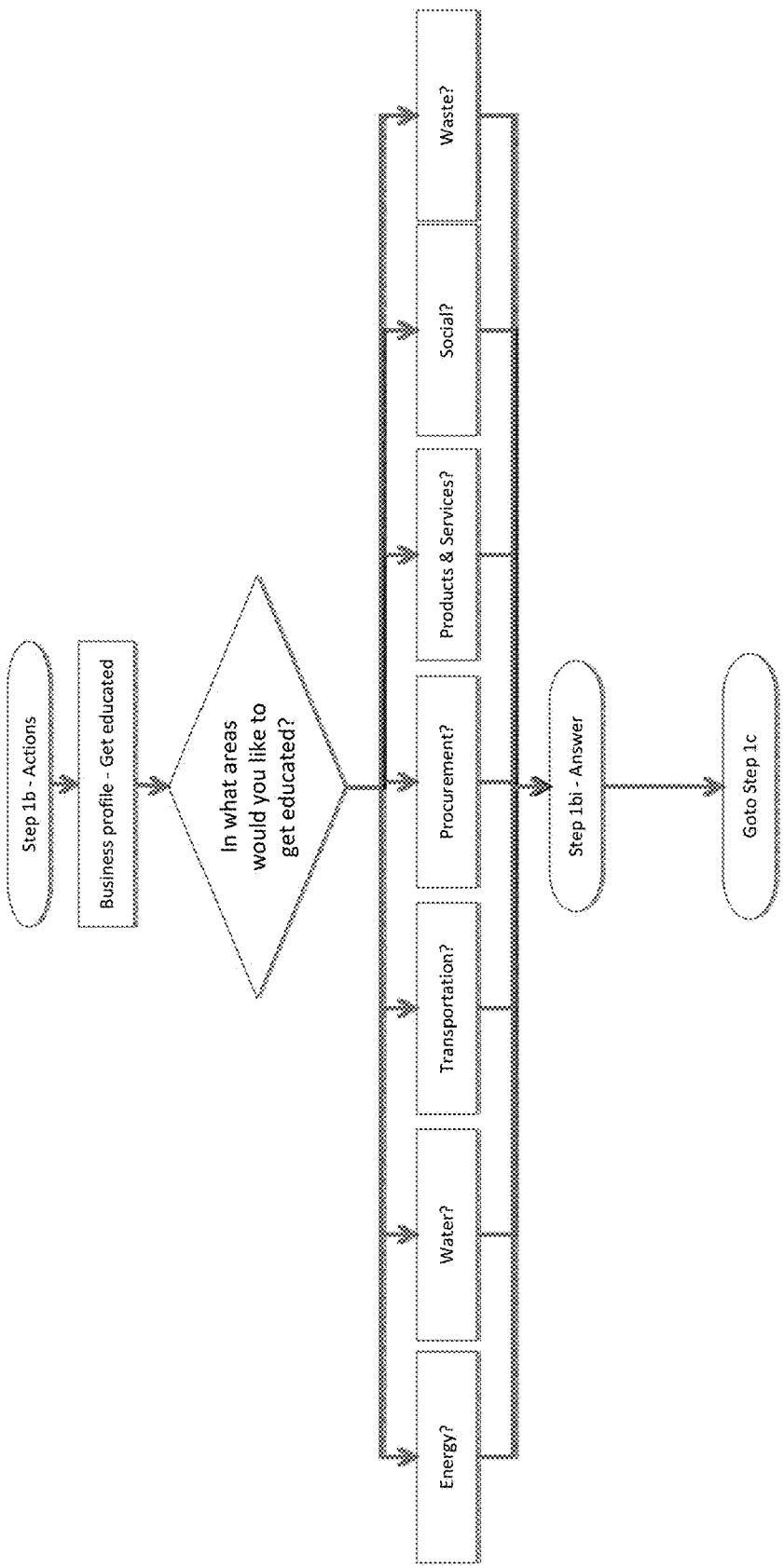
Figure 5G:
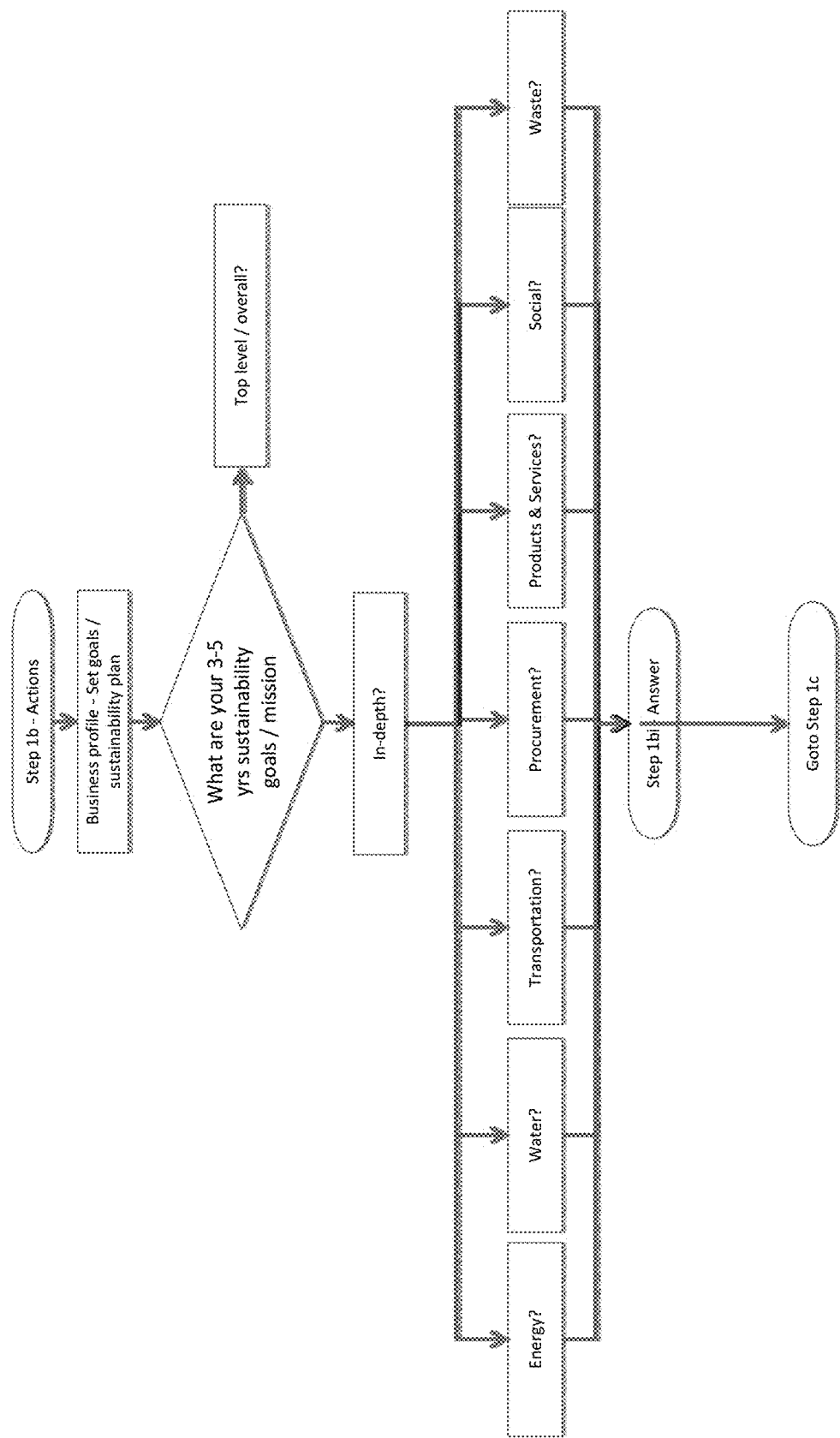

Once the user in logged into the system, the user is asked to respond to a question (which is part of the data input process) and that process is shown in more detail in FIG. 5A. As shown in FIG. 5A, the user is asked "What would you like to do?" by the system. In one implementation, the user has the options to: 1) track sustainability metrics (the details of the data input for this item as shown in FIG. 5B); 2) improve the sustainability performance of the company (the details of the data input for this item as shown in FIG. 5C); 3) report the sustainability findings (the details of the data input for this item as shown in FIG. 5D); 4) get certified for sustainability (the details of the data input for this item as shown in FIG. 5E); 5) get educated about sustainability (the details of the data input for this item as shown in FIG. 5F); and 6) set goals/develop sustainability plan (the details of the data input for this item as shown in FIG. 5G). The data input may also include quantative data capture that is described in more detail with reference to FIG. 5H. The data from all of the data input processes are stored in the system under the user profile.

If the user selects to track sustainability metrics, the data input process shown in FIG. 5B is performed. To track the sustainability metrics, the system asks the user to enter the utility providers (waste, water, watts and others) into the system and then the process proceeds to the process shown in FIG. 5H in which the system does quantitative data capture that includes energy data, water data, transportation data, procurement data, products and services data, social data and waste data.

If the user wants to improve the sustainability performance of the company, the data input process shown in FIG. 5C is performed. The system, as shown in FIG. 5C, inquires about the completed actions or actions to be completed in the various sustainability areas (which include the ones shown in FIG. 5C such as waste, water, transportation, etc. that are referred to hereafter as the "sustainability areas"). The system may also ask the user if the user wants a more detailed return on investment (ROI) analysis and, if the user wants a more detailed return on investment (ROI) analysis, performs audits in the various sustainability areas and returns the detailed ROI answer to the user. If the user does not want a more detailed return on investment (ROI) analysis, the system goes to the data output process.

If the user wants to report the sustainability findings, the data input process shown in FIG. 5D is performed. During the process, the system determines the type of report that the user wants, such as a carbon footprint report, a sustainability report or a different report, and generates the report for the user. Once completed, the system goes to the quantitative data capture process shown in FIG. 5H.

If the user wants to get certified, the data input process shown in FIG. 5E is performed. During the process, the system inquires as to whether the user/business has an existing certifications. If the business already has certifications, the system obtains the particular certifications of the business or asks the user who they want to be certified with (wherein the system can be used with various different certifications, such as Walmart, HP, P&G, Green Business Council and others. Once the data gathering about the certifications is completed, the system goes to the quantitative data capture process shown in FIG. 5H.

If the user wants to get educated, the data input process shown in FIG. 5F is performed. During the process, the system asks the user about the areas in which the user would like to get educated that may be any of the sustainability areas and generates education content about the selected sustainability area or areas. Once the data gathering about the education is completed, the system goes to the quantitative data capture process shown in FIG. 5H.

If the user wants to set goals/a sustainability plan, the data input process shown in FIG. 5G is performed. During the process, the system requests information about the user/businesses 3-5 year sustainability goals/mission and then provides a top level/overall summary or an in depth summary of one or more of the sustainability areas. Once the data gathering about the education is completed, the system goes to the quantitative data capture process shown in FIG. 5H.

Figure 5H:
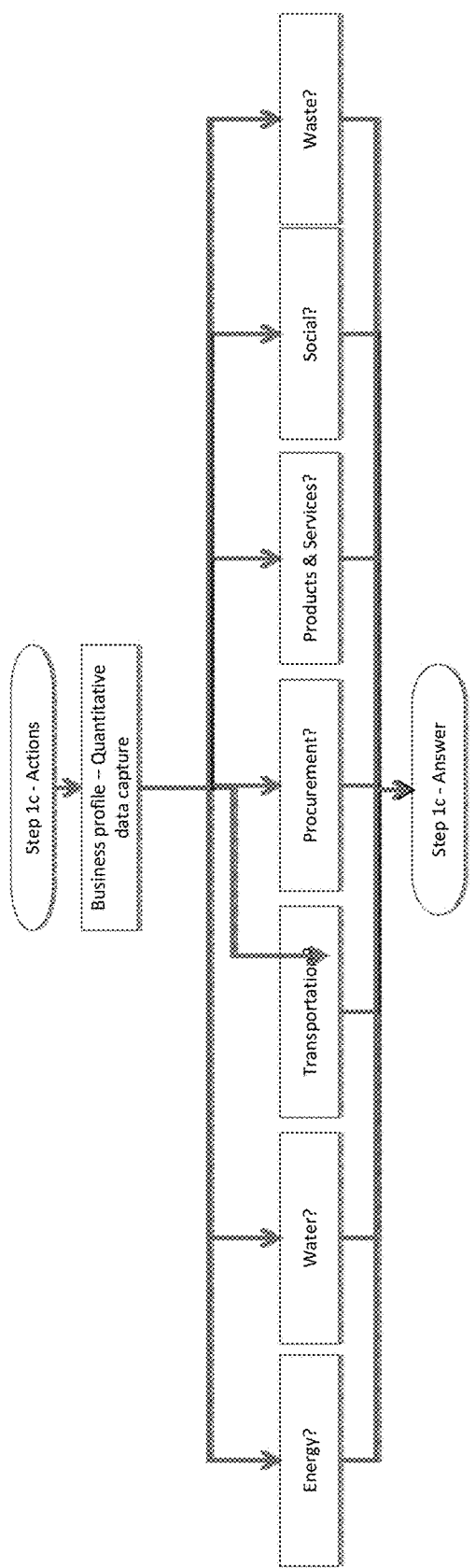

During the quantitative data capture process shown in FIG. 5H, the system captures data about the one or more sustainability areas as shown and the quantitative data is stored in the system indexed against the user's profile.

Figure 6:
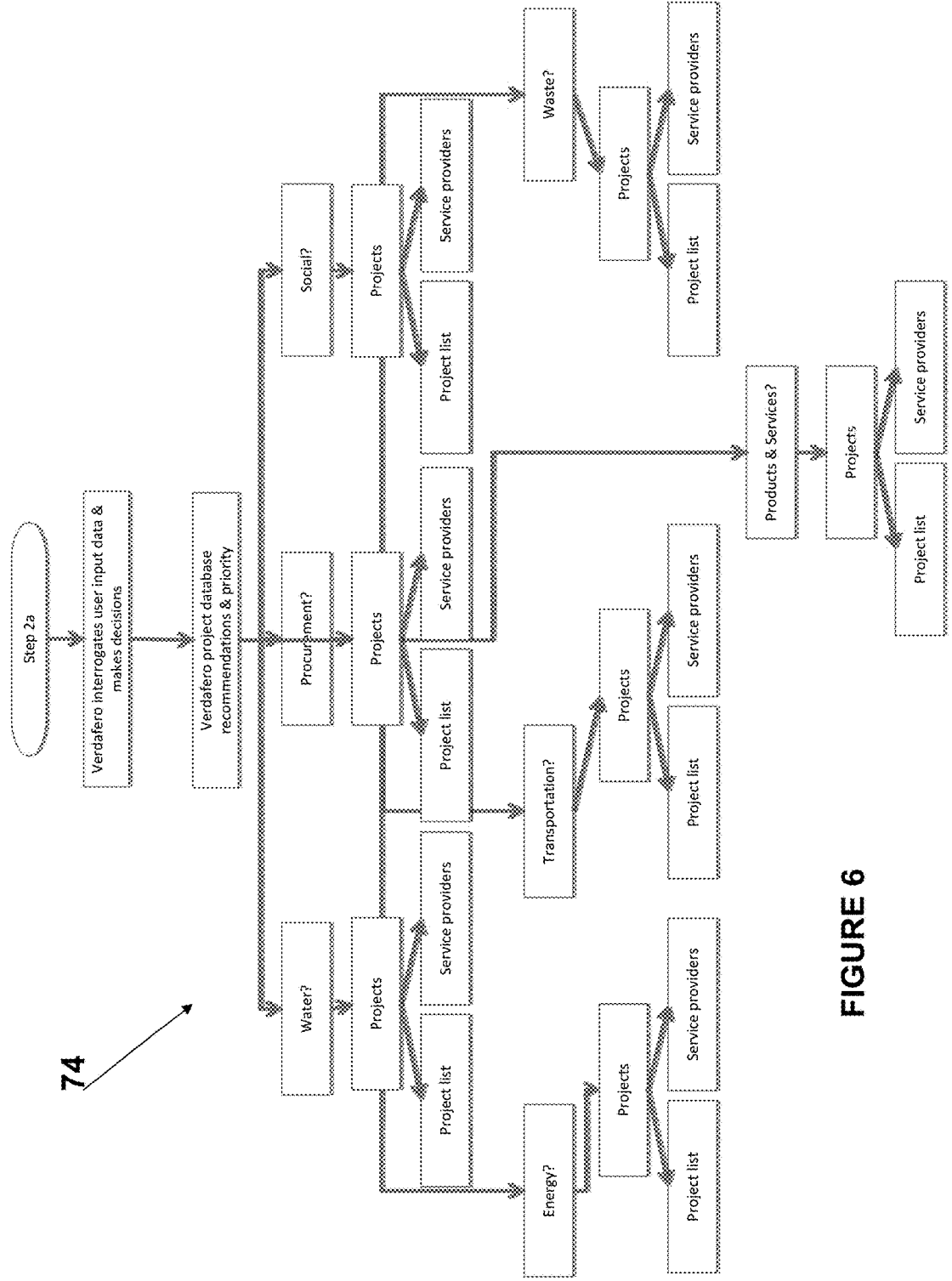
FIG. 6 illustrates more details of the data analysis process that is part of the method for sustainable business development management.

Returning to FIG. 4, once the data input is completed, the process move onto the data analysis process 74 that is shown in more detail in FIG. 6. During the analysis process, the system implements an algorithm to takes into account the ROI and other factors to determine a list of priorities for the particular user/business based on the input data. Based on the determined priorities, the system can recommend projects in the one or more sustainability areas, may prioritize the recommendations, and/or provide links to products/services related to the recommendations/projects. Thus, as shown in FIG. 6, the system can make project recommendations in one, a few, many or all of the one or more sustainability areas. For each sustainability area, the system may provide a project list of one or more projects in that sustainability area and/or a list of service providers/products to implement the recommended projects.

The system may permit the projects to be sorted by: profile such as the type of business (such as industry vertical (NAICS or similar); ownership status of facilities and other infrastructure (vehicles, data center, etc.) such as own bldg, rent vehicles, 3rd party hosting, etc.; projects & certifications already completed; goals for organization, such as save x% electricity and/or save x% water; and/or priority.

Returning to FIG. 4, once the data analysis is completed for the particular user/business, the process moves onto the data output process 76. During the data output process, the system allows the particular user to select the one or more desired outputs and the reports output A/R. In the data output process, the user may be presented with views (dashboard) and/or print, .pdf, etc. of: *Sustainability Report; Performance details (metrics); Project Report; and/or Status details A/R.

Figure 7A:
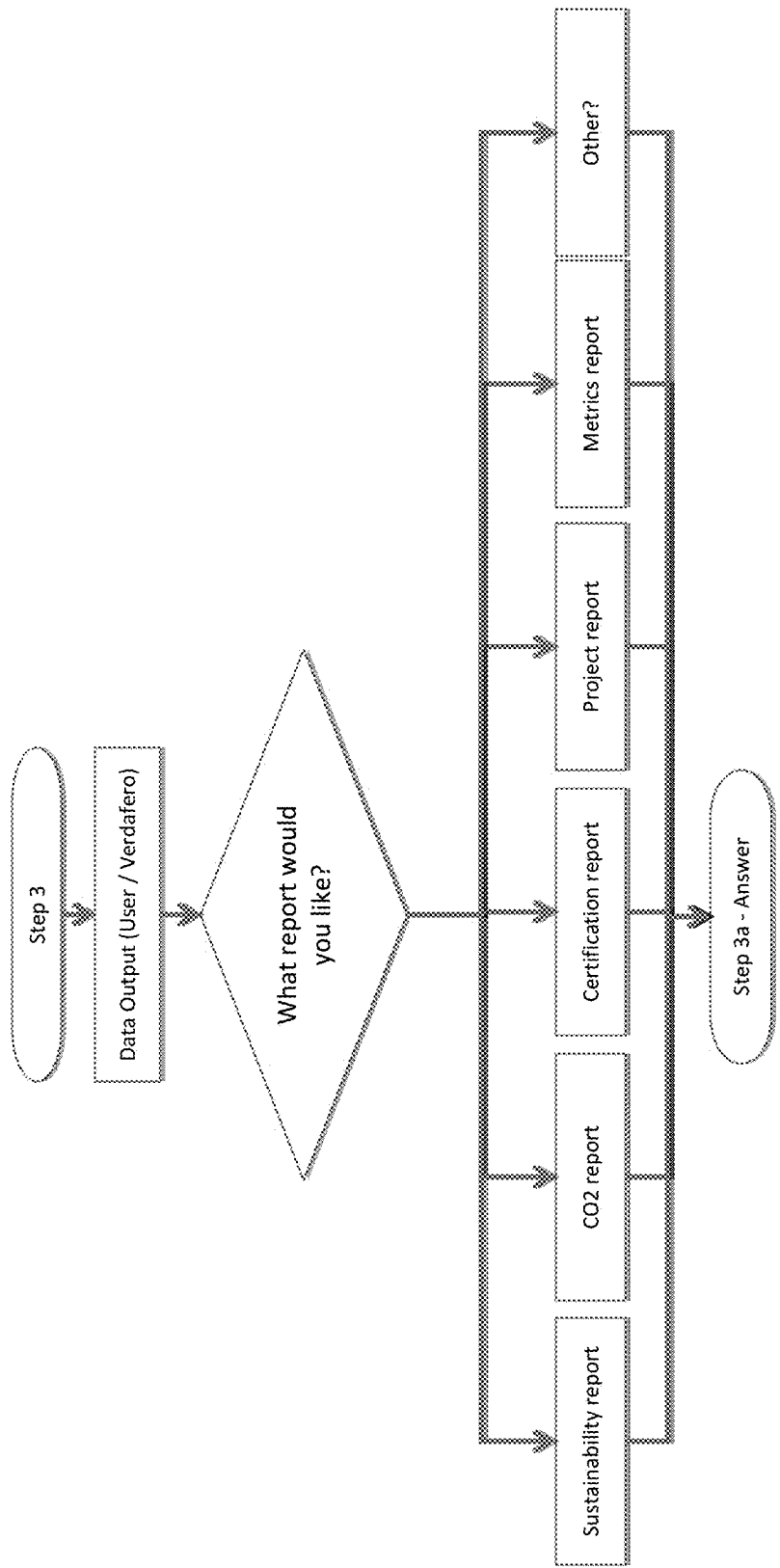
FIGS. 7A-7F illustrate more details of the data output process that is part of the method for sustainable business development management.
Figure 7B:
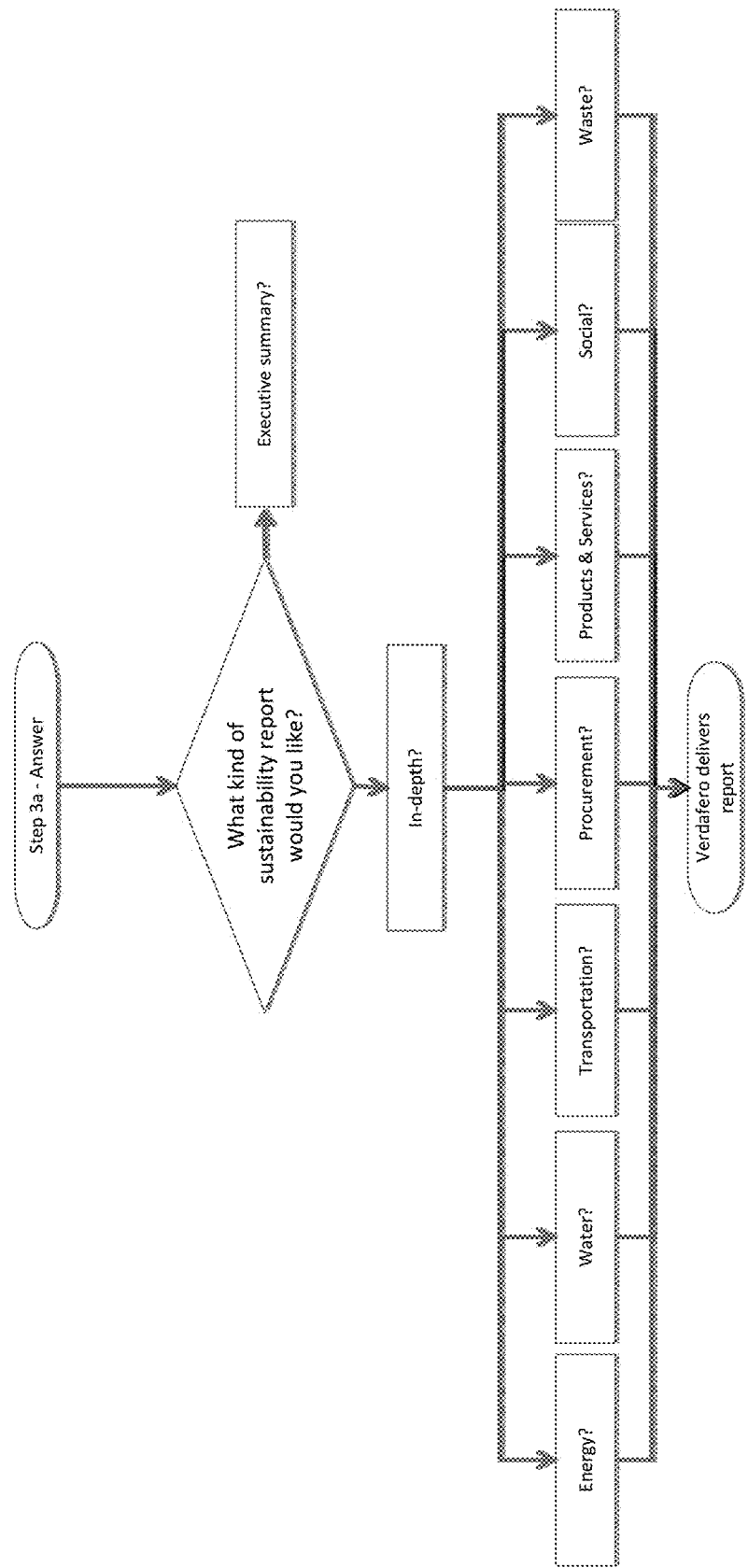
Figure 7C:
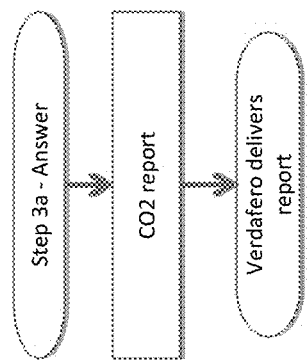
Figure 7D:
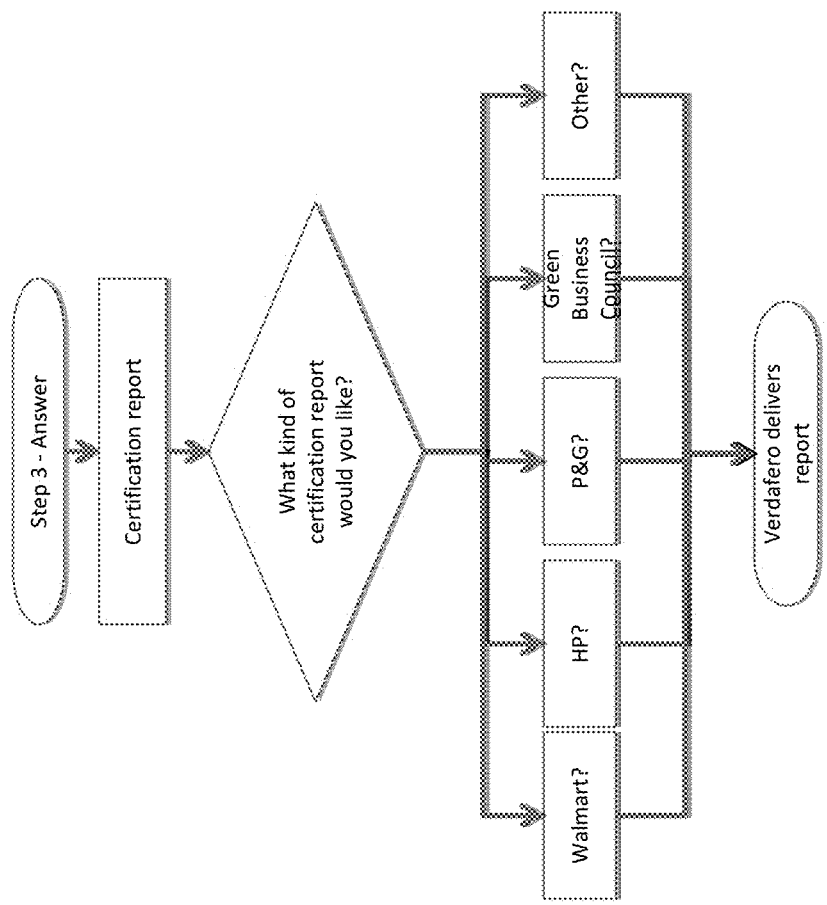
Figure 7E:
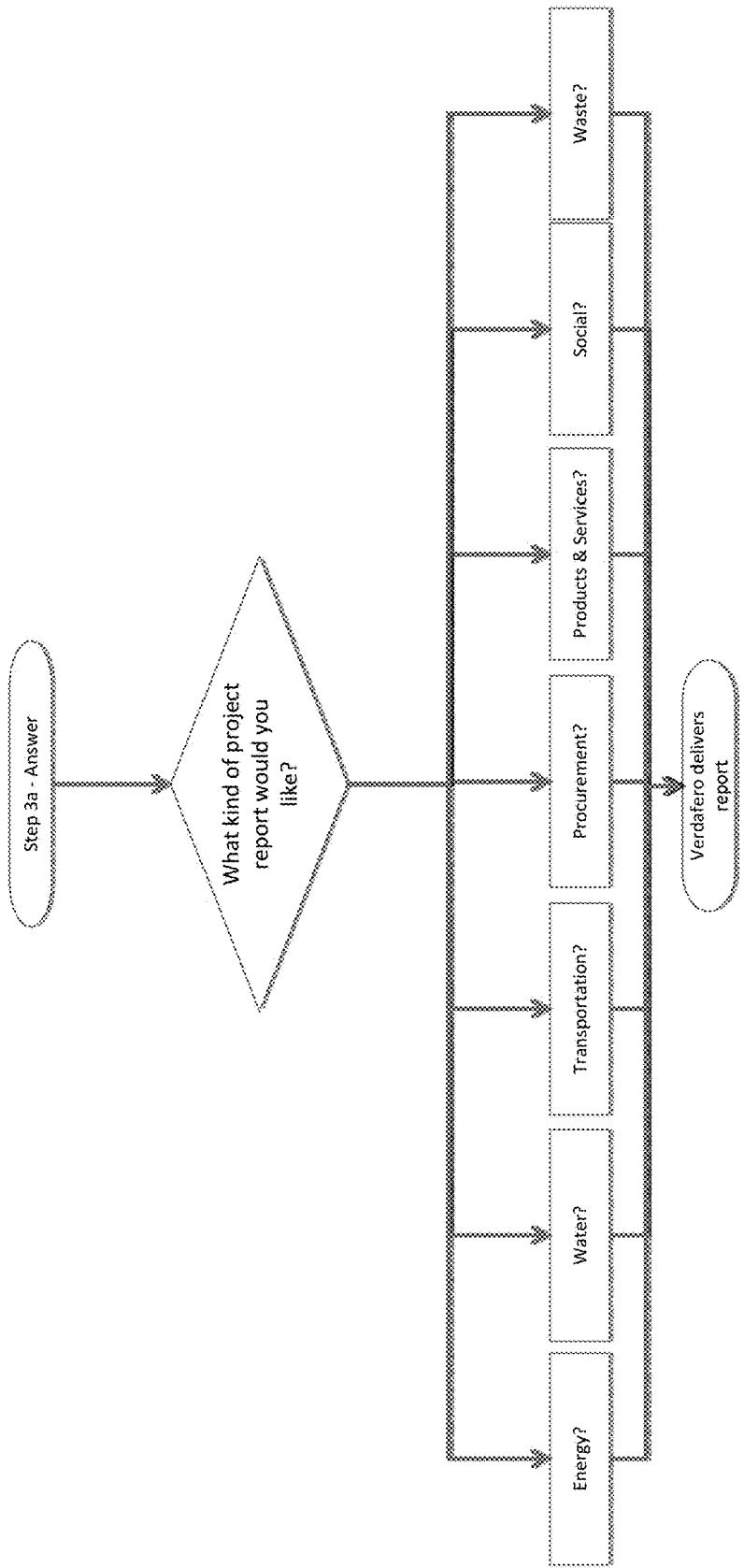
Figure 7F:
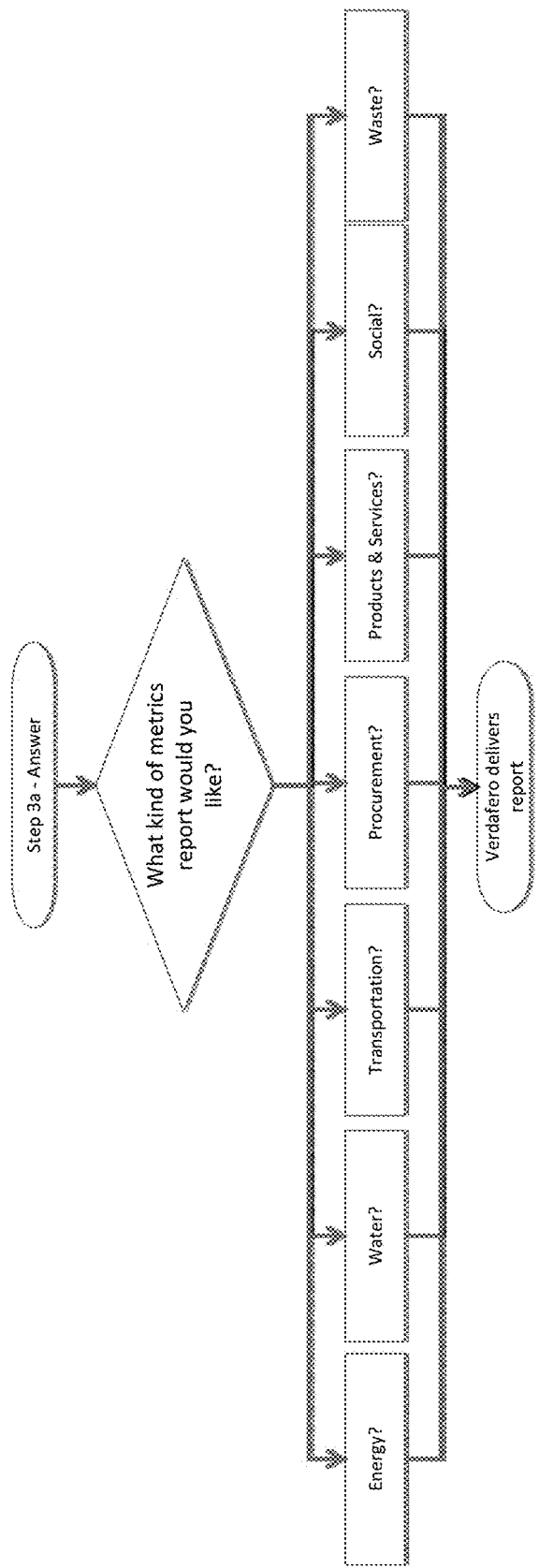

During the data output process, the user may select a report (as shown in FIG. 7A) that may include: a sustainability report (the details of which process to generate the report are shown in FIG. 7B); a $CO_2$ report (the details of which process to generate the report are shown in FIG. 7C); a certification report (the details of which process to generate the report are shown in FIG. 7D); a project report (the details of which process to generate the report are shown in FIG. 7E); a metrics report (the details of which process to generate the report are shown in FIG. 7F) and other reports that the system can generate or that can be created by the user.

Figure 8:
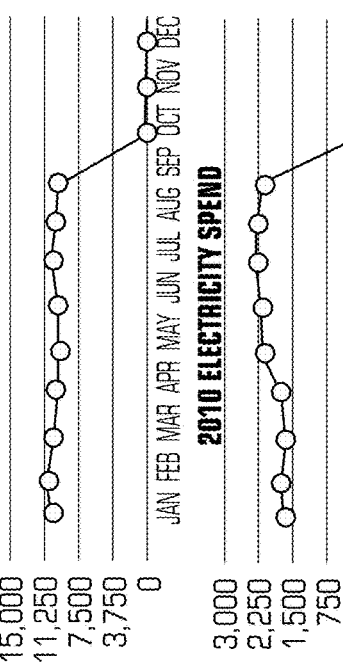
FIG. 8 illustrates an example of a sustainability summary that can be generated by the sustainable business development management system.
Figure 8:
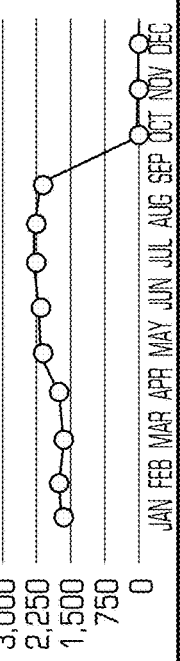
Figure 8:
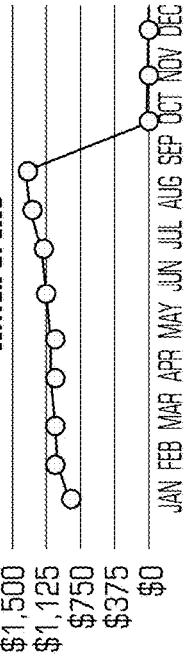
Figure 8:
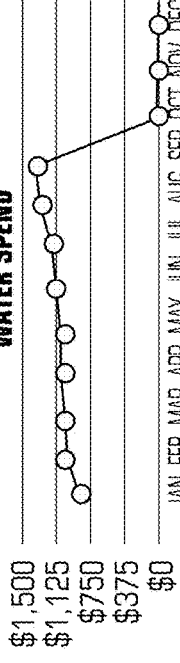
Figure 8:
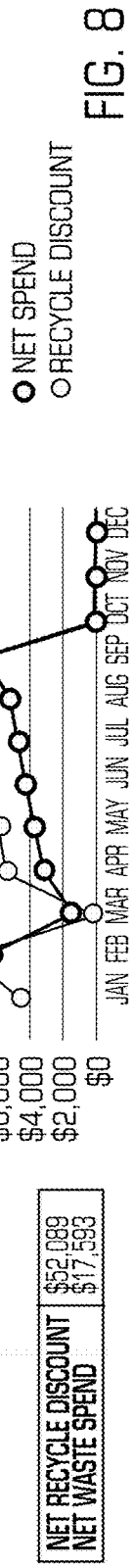
Figure 8:
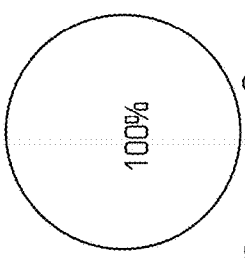

During the sustainability report process as shown in FIG. 7B, the system determines if the user wants an executive summary and can provide that to the user (an example of which is contained in Appendix A which is incorporated herein by reference) or an in depth report related to the one or more sustainability areas and can then provide those reports. During the $CO_2$ report, the system generates and delivers the $CO_2$ report as shown in FIG. 7C. During the certification report process shown in FIG. 7D, the system determines the type of certification report (a report delivered to the user to meet certification requirements for a particular entity, such as the entities shown in FIG. 7D and the generates and delivers the desired certification report to the user. During the project report process shown in FIG. 7E, the system determines the type of project report desired by the user wherein the project is for one or more of the sustainability areas shown and then generates and delivers that report to the user as described below in more detail. During the metrics report process shown in FIG. 7F, the system determines the type of metrics report wherein the project is for one or more of the sustainability areas shown and then generates and delivers that report to the user. An example of this type of report is shown in FIG. 8 in which different sustainability areas are shown (energy, water and waste for example in FIG. 8) along with the metrics for each sustainability area. Now, more details of examples of the user interface of the sustainable business development management system are described in more detail.

Figure 9A:
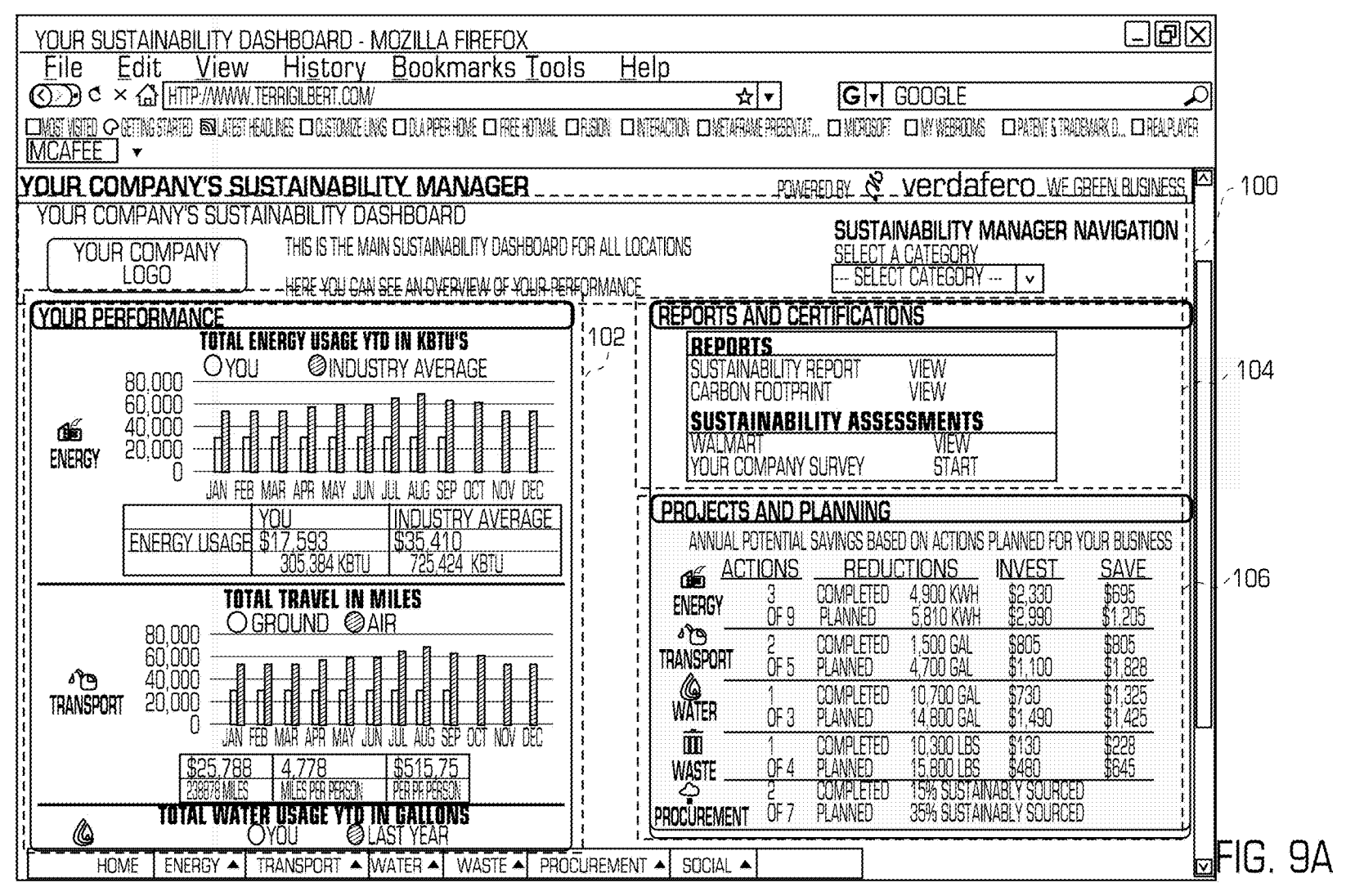
Figure 9B:
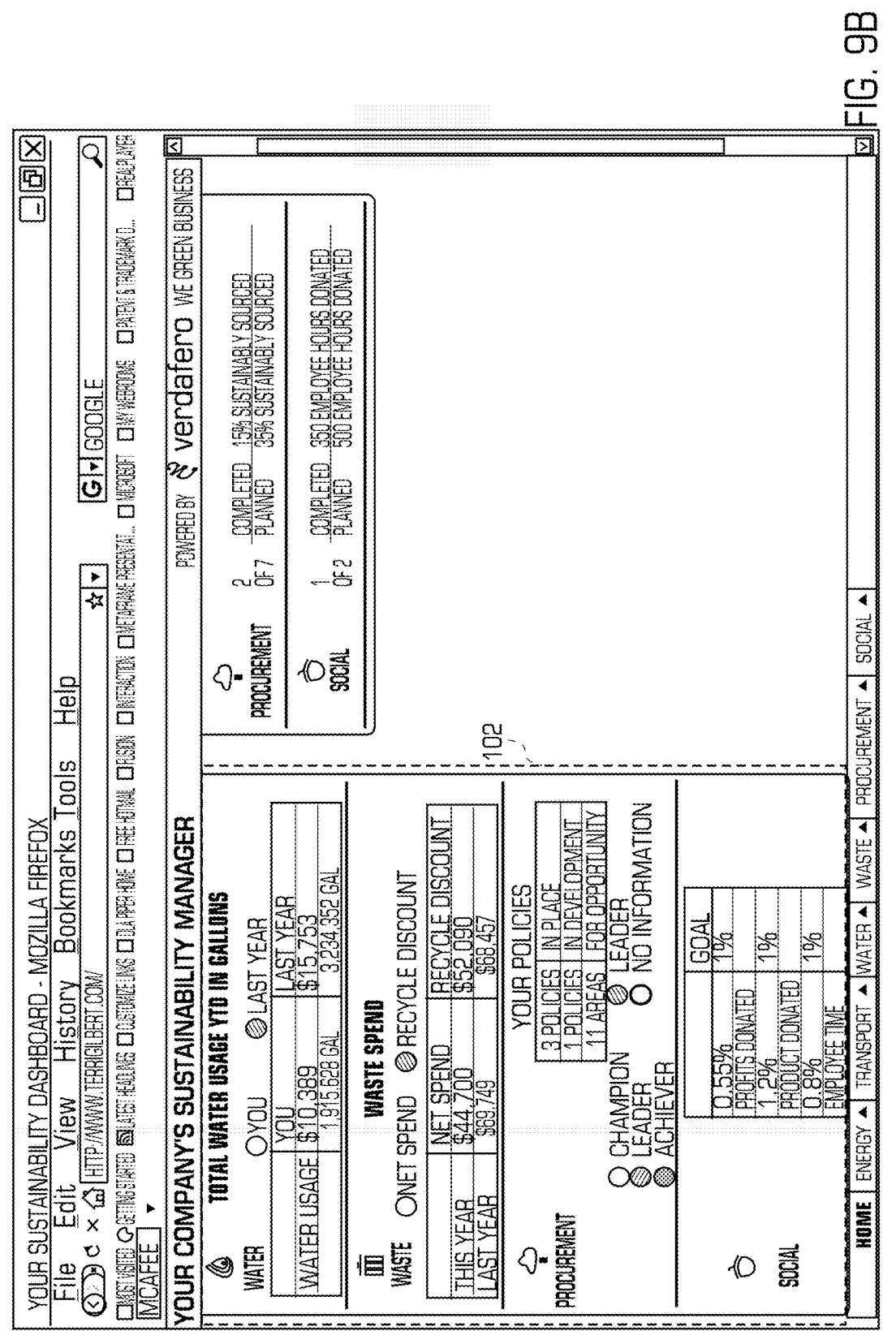

FIGS. 9A-9B illustrate an example of a company main sustainability dashboard user interface of the sustainable business development management system. The user interface may include a summary portion 100 (that also allows the user to select a category to navigate to quickly), a sustainability summary portion 102 that has the key statistics for each sustainability category, a reports and certification portion 104 that displays the reports and certifications for the particular business whose user is viewing the user interface and a projects and planning portion 106 that displays the projects for the business. The company main sustainability dashboard user interface thus permits the user who is viewing the user interface to get a good overview of the sustainability progress of the business.

Figure 10A:
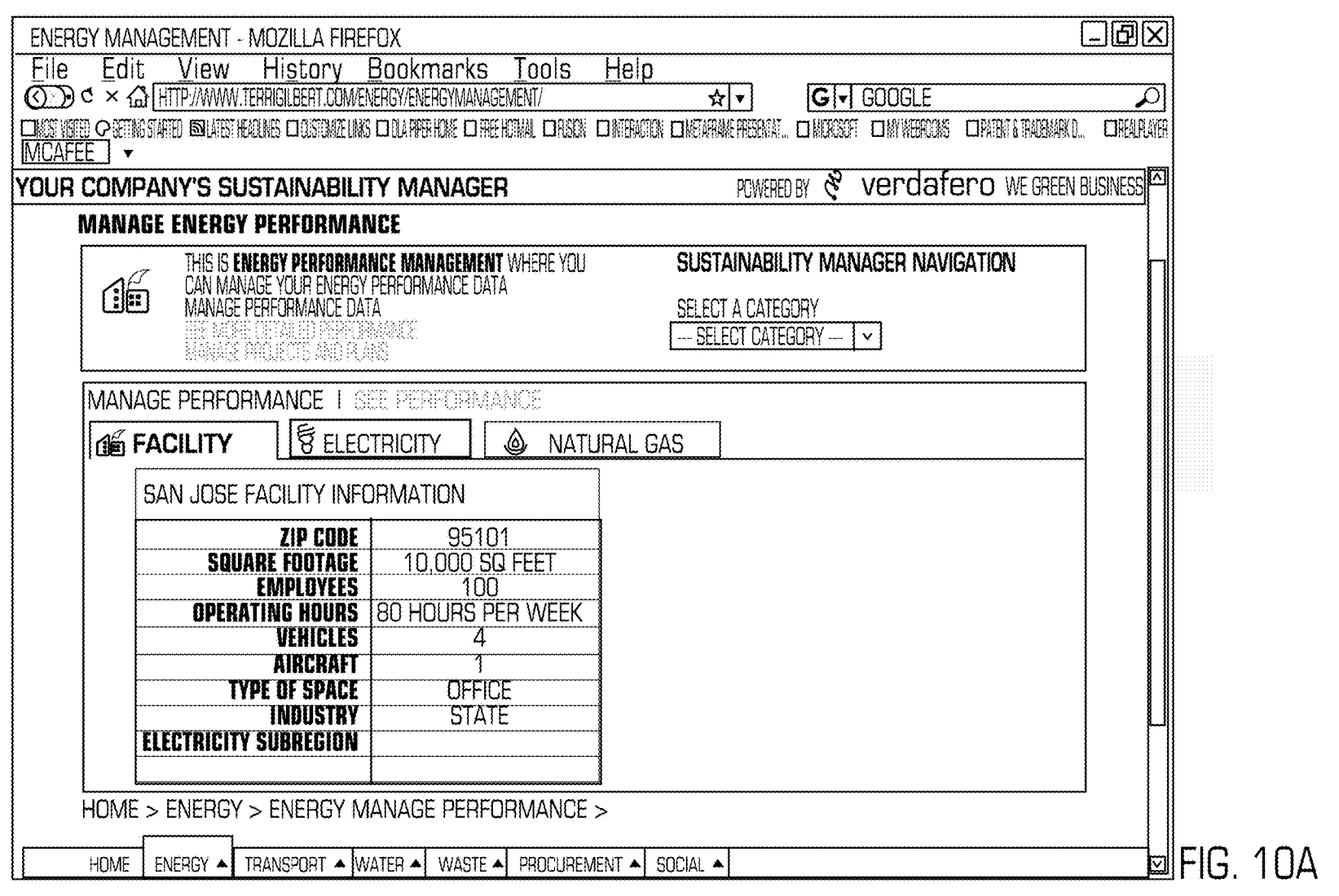
Figure 10B:
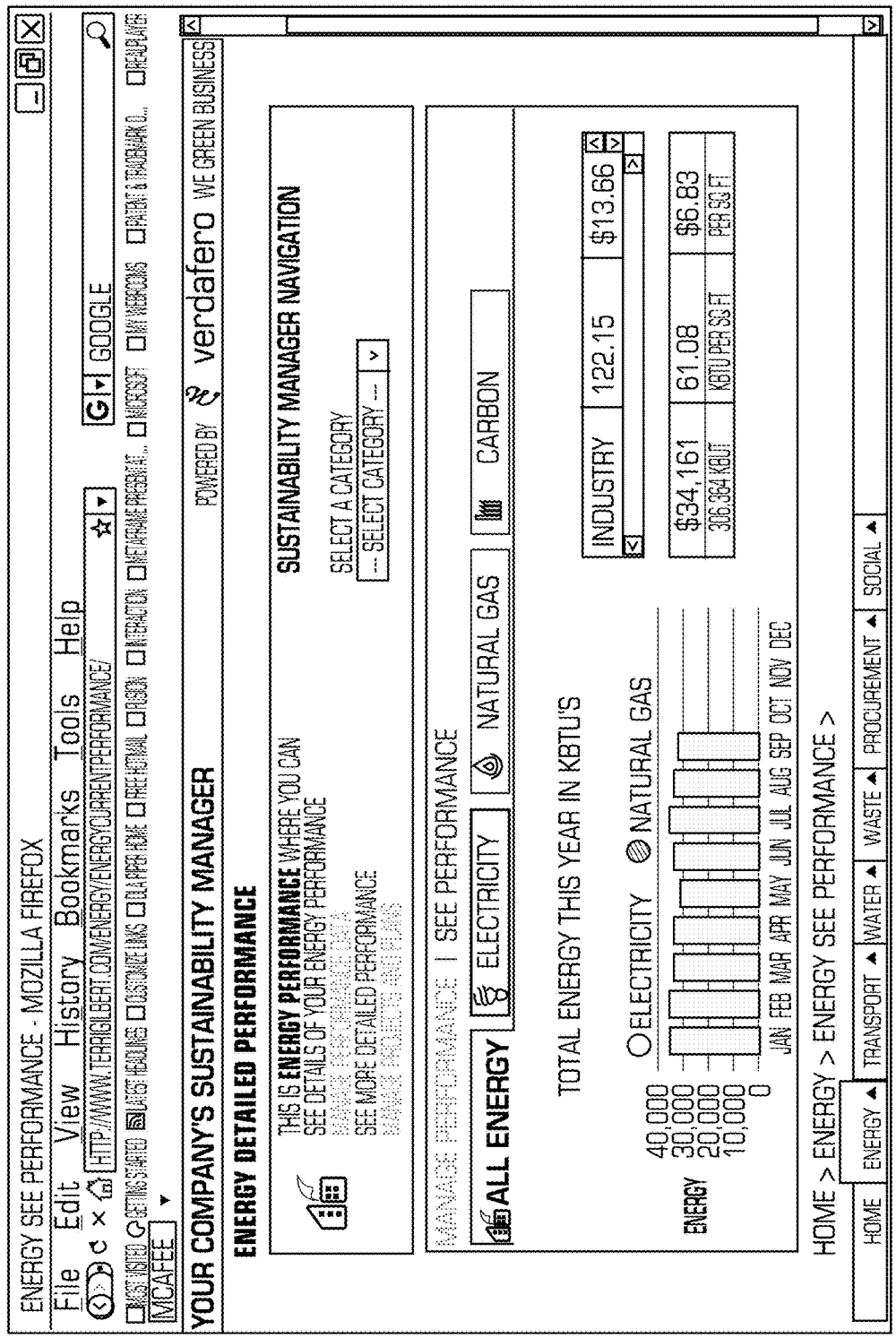
Figure 10C:
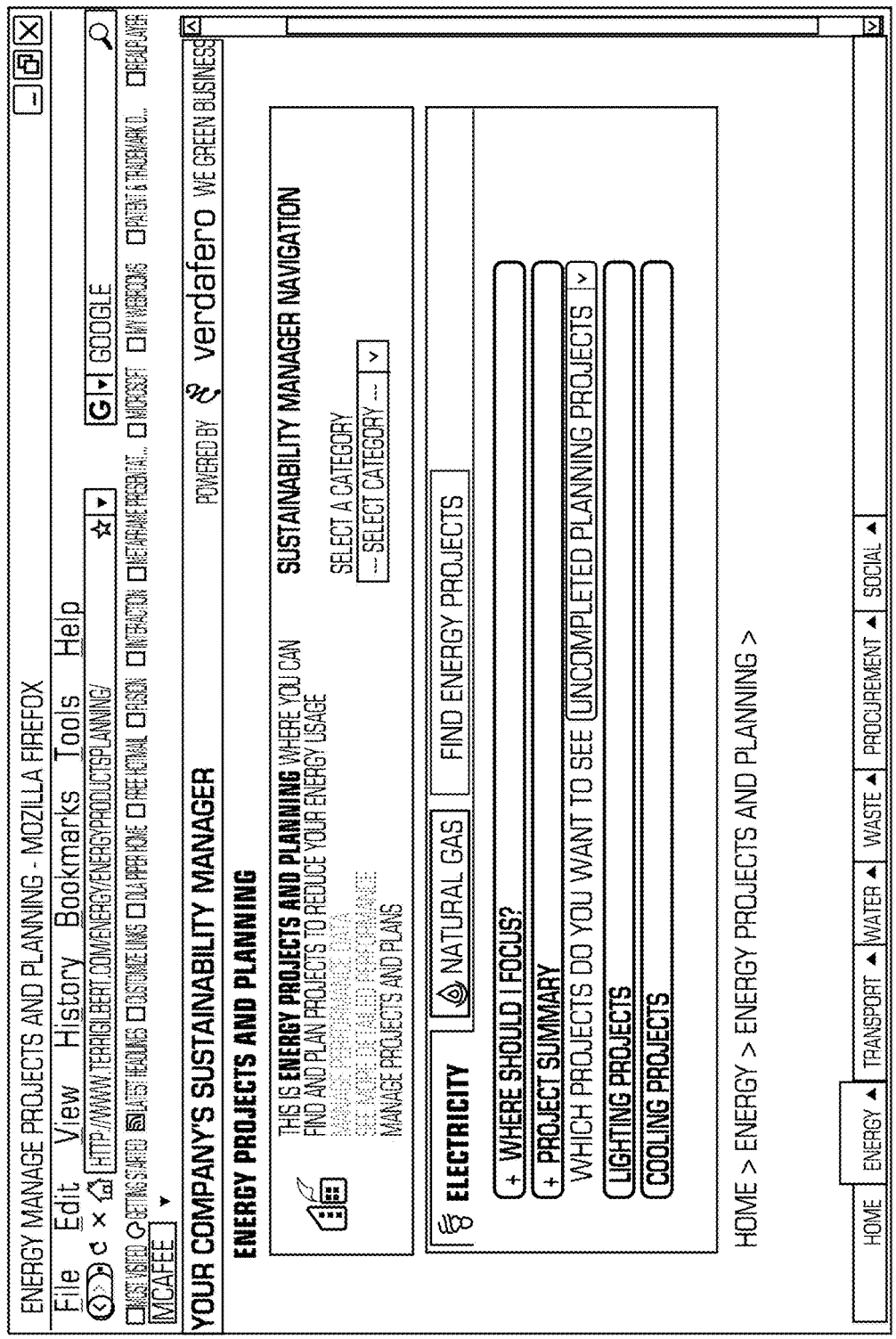

FIGS. 10A-10C illustrate an example of energy sustainability user interfaces of the sustainable business development management system. The energy sustainability user interfaces may include a manage performance user interface as shown in FIG. 10A, a detailed energy performance user interface as shown in FIG. 10B (that includes detailed statistics about the energy usage of the business) and an energy projects and planning user interface as shown in FIG. 10C wherein each project (such as a lighting projects and cooling projects, for example) and the details for each project can be displayed to the user.

Figure 11A:
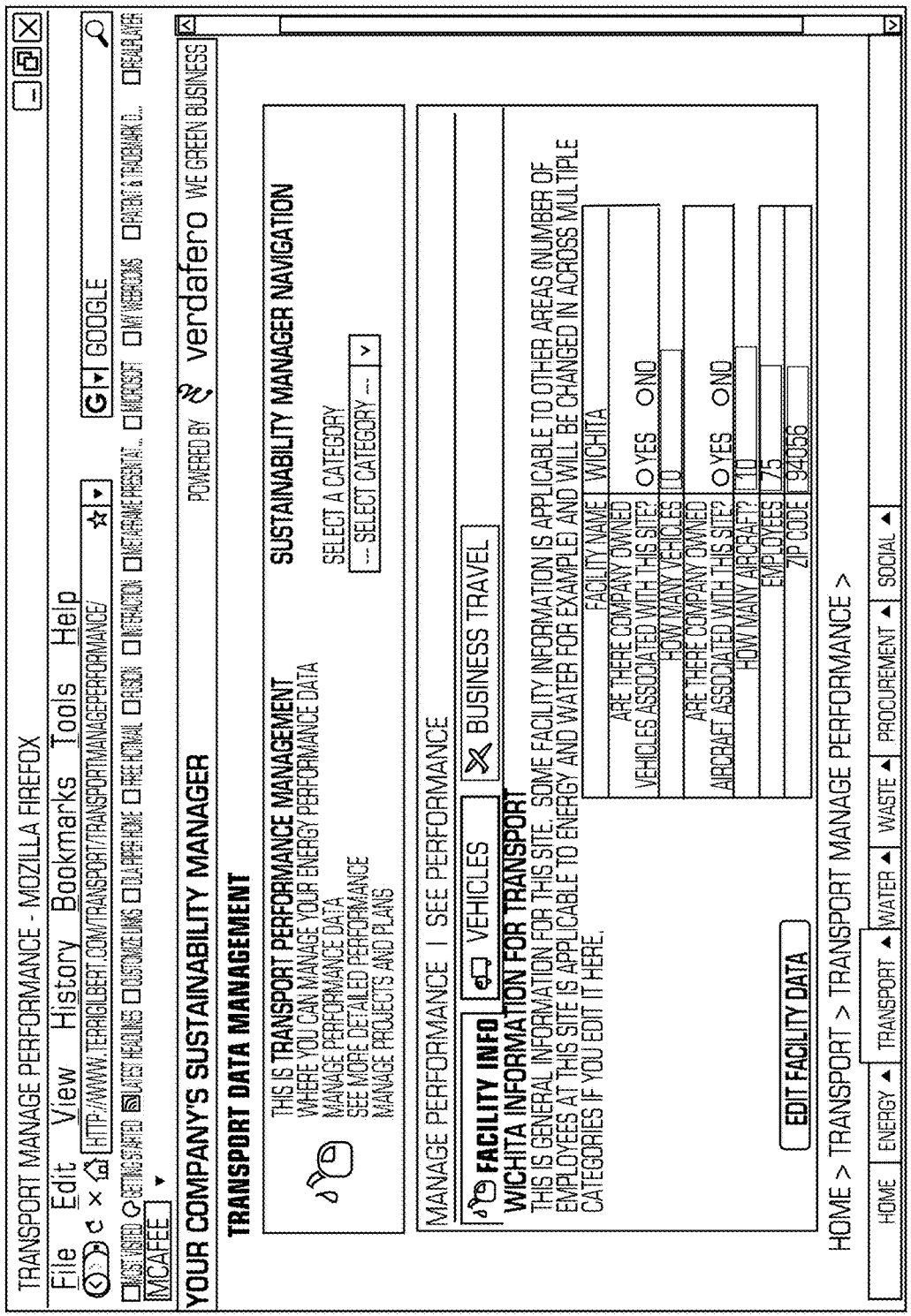
FIGS. 11A-11C illustrate an example of transportation sustainability user interfaces of the sustainable business development management system.
Figure 11B:
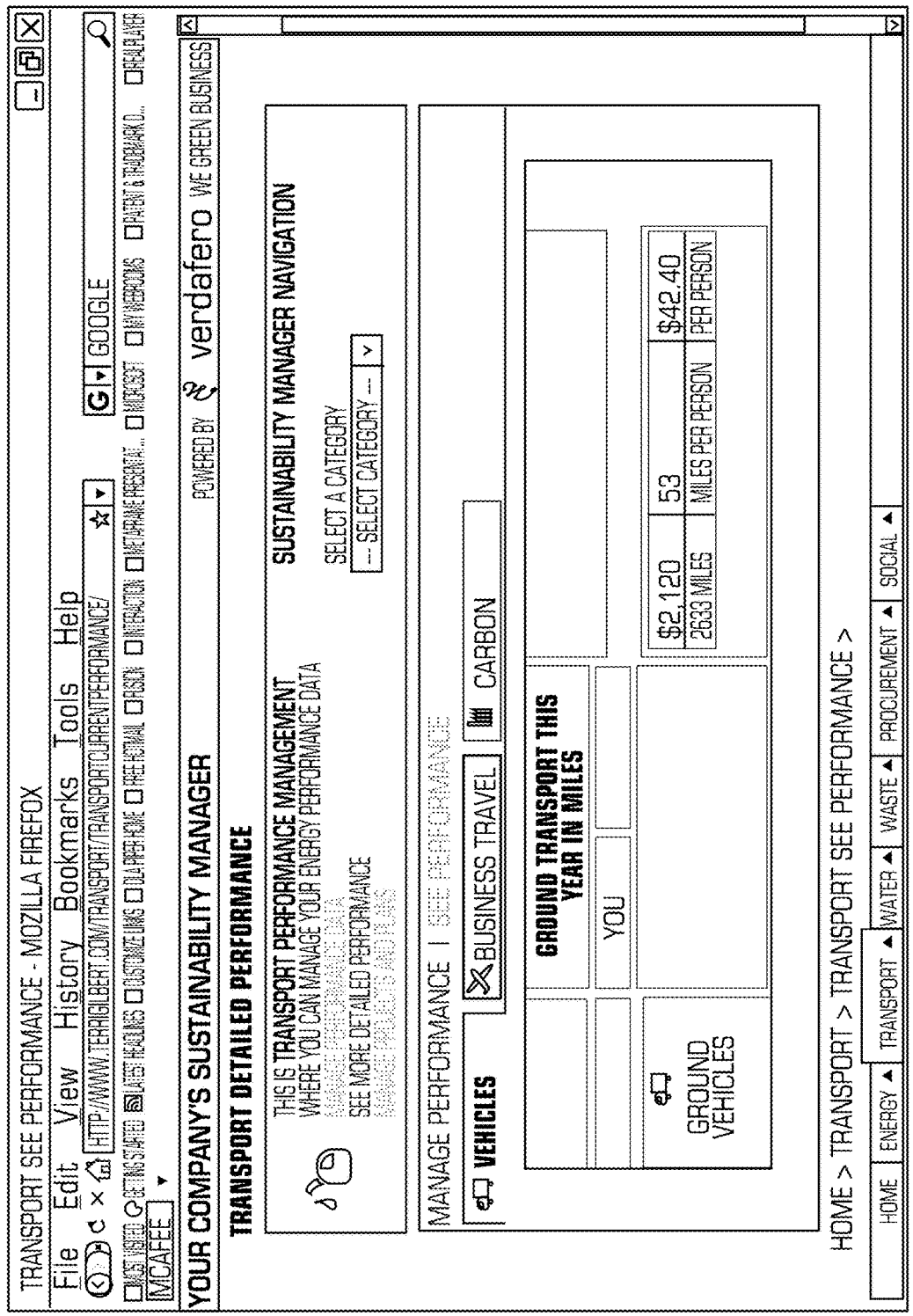
Figure 11C:
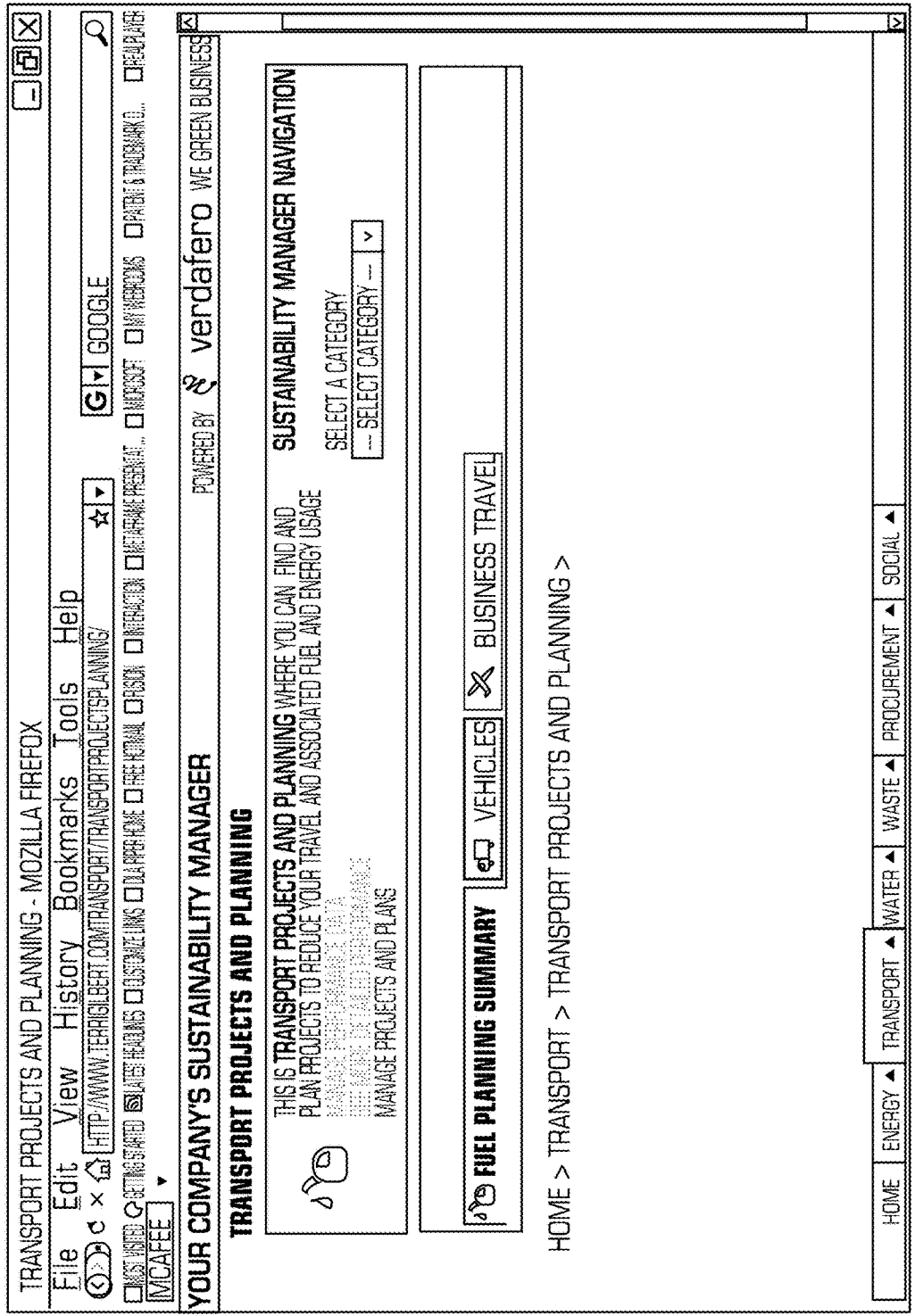

FIGS. 11A-11C illustrate an example of transportation sustainability user interfaces of the sustainable business development management system. The transportation sustainability user interfaces may include a manage performance user interface as shown in FIG. 11A, a detailed transportation performance user interface as shown in FIG. 11B (that includes detailed statistics about the transportation usage of the business) and a transportation projects and planning user interface as shown in FIG. 11C wherein each project and the details for each project can be displayed to the user.

Figure 12A:
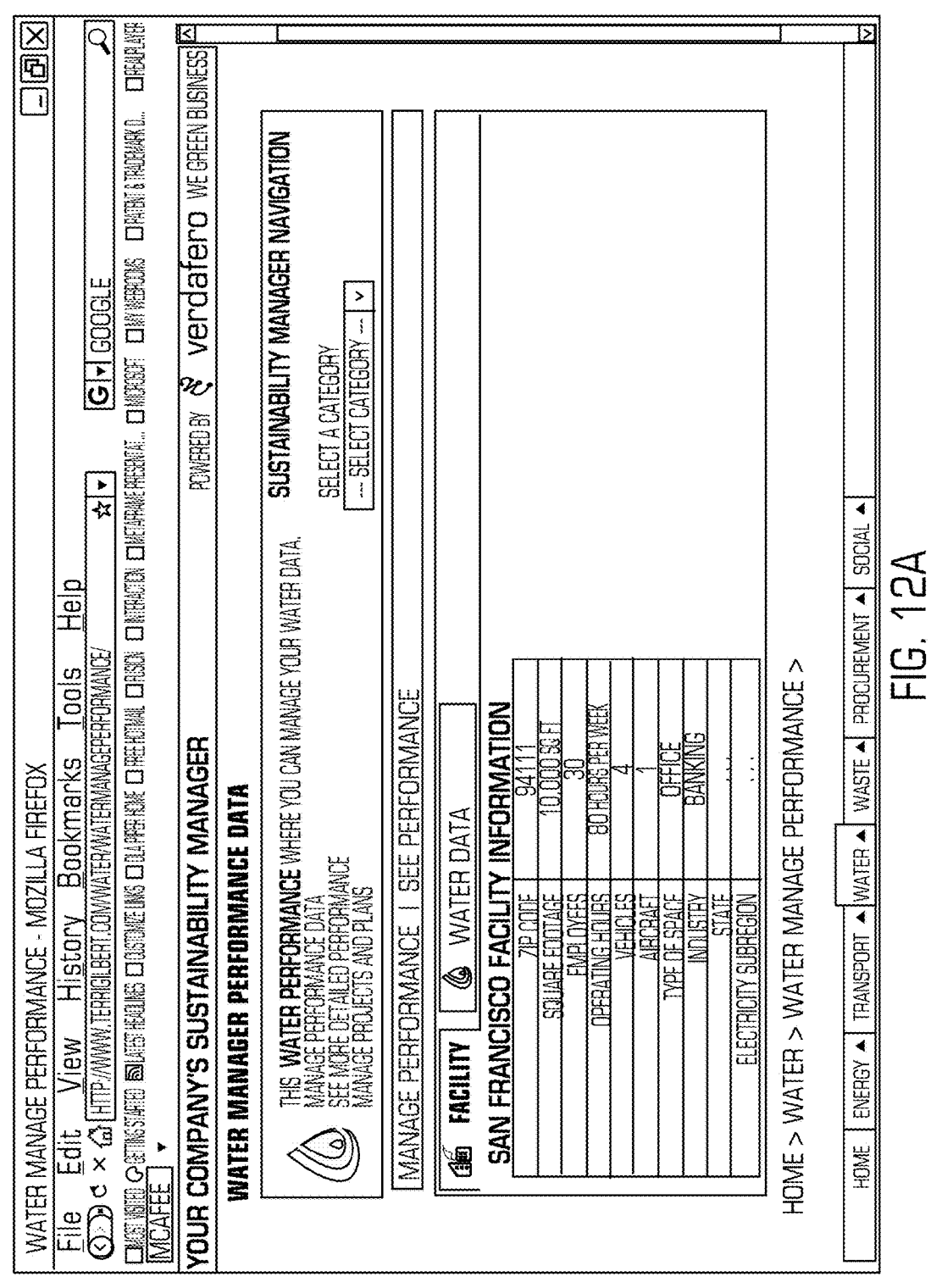
Figure 12B:
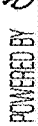
Figure 12C:
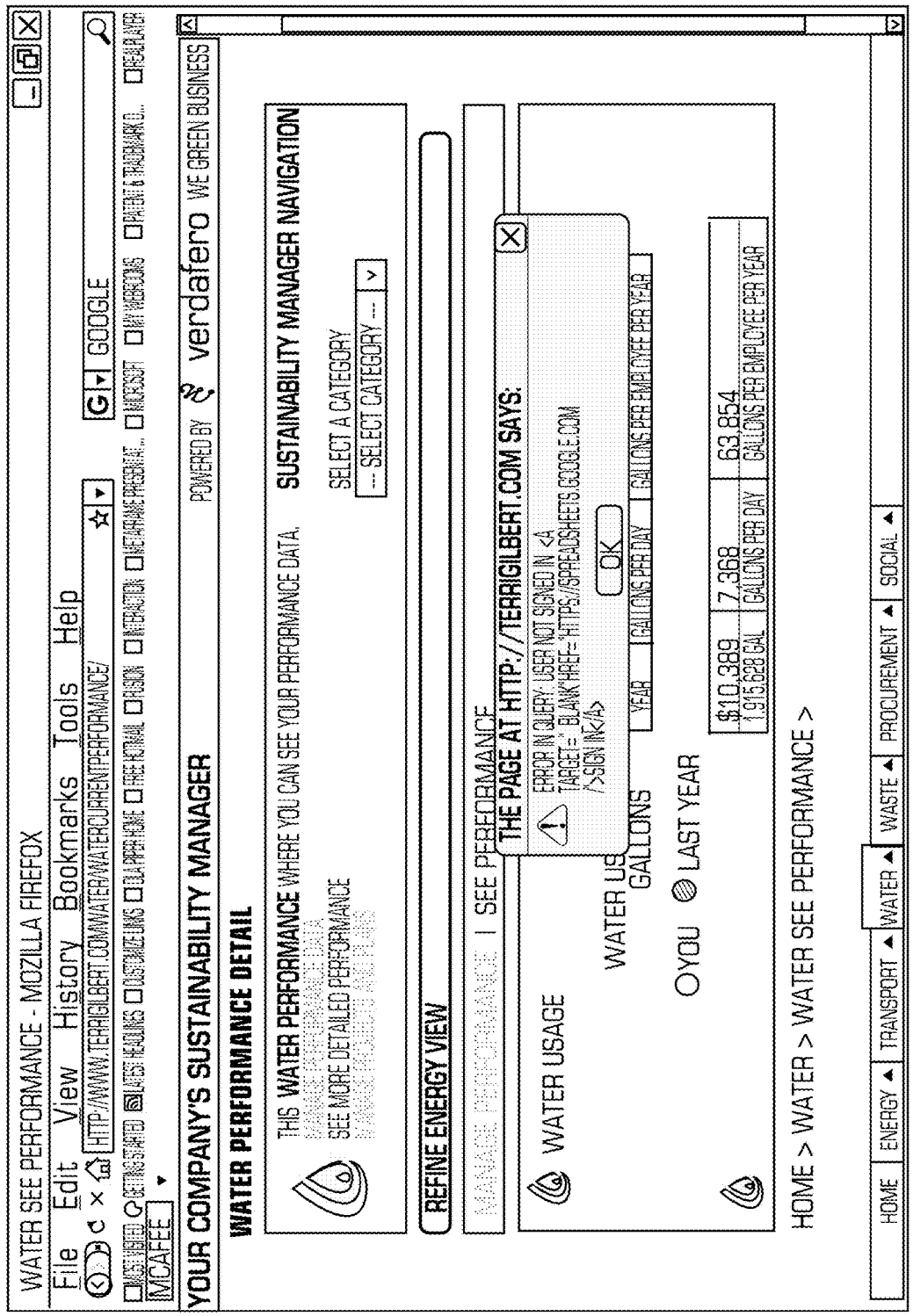
Figure 12D:
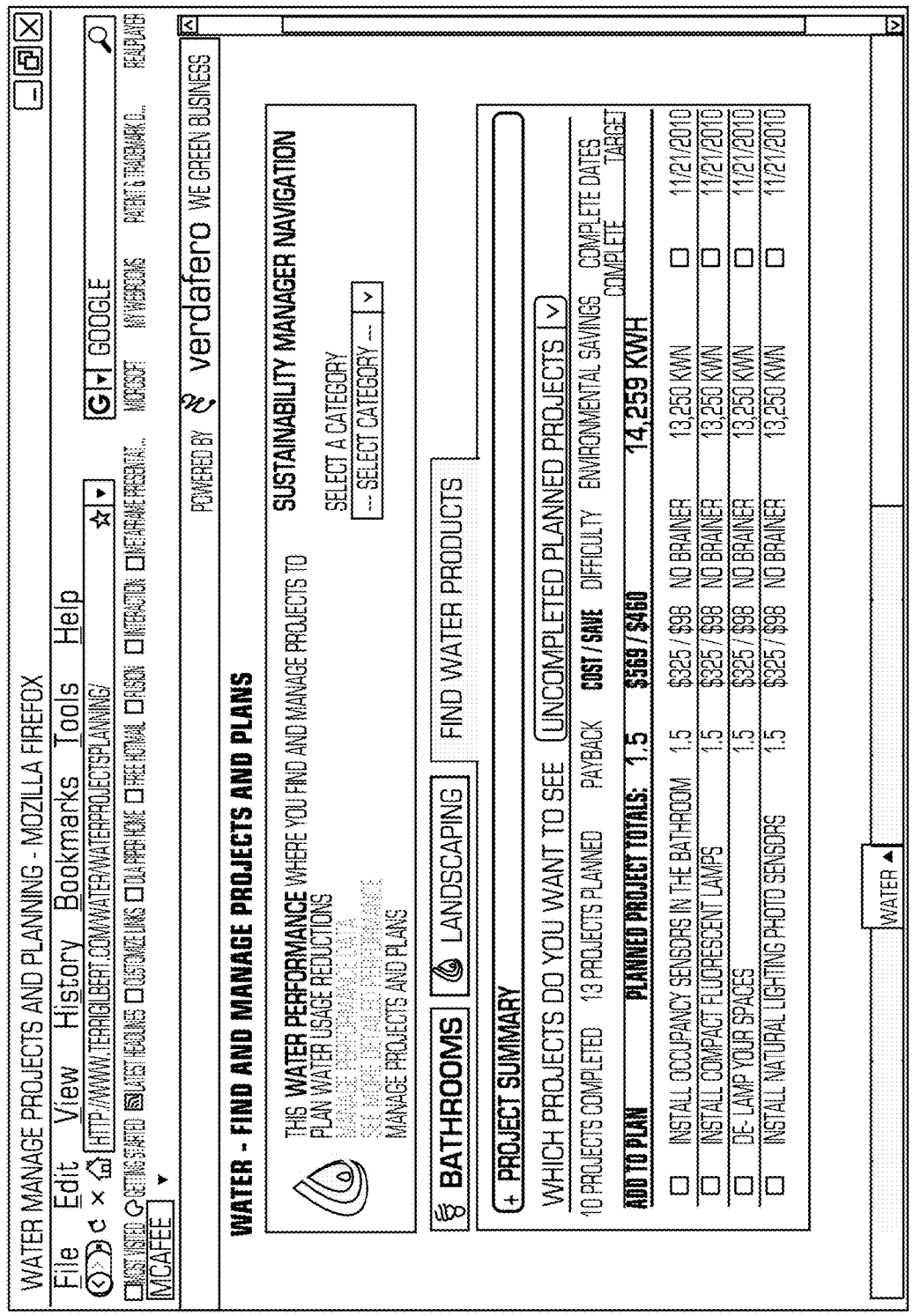

FIGS. 12A-12D illustrate an example of water sustainability user interfaces of the sustainable business development management system. The water sustainability user interfaces may include a manage performance user interface as shown in FIG. 12A, a water detailed user interface as shown in FIG. 12B, a water usage detail user interface as shown in FIG. 12C and a water projects and planning user interface as shown in FIG. 11D wherein each project and the details for each project can be displayed to the user.

Figure 13A:
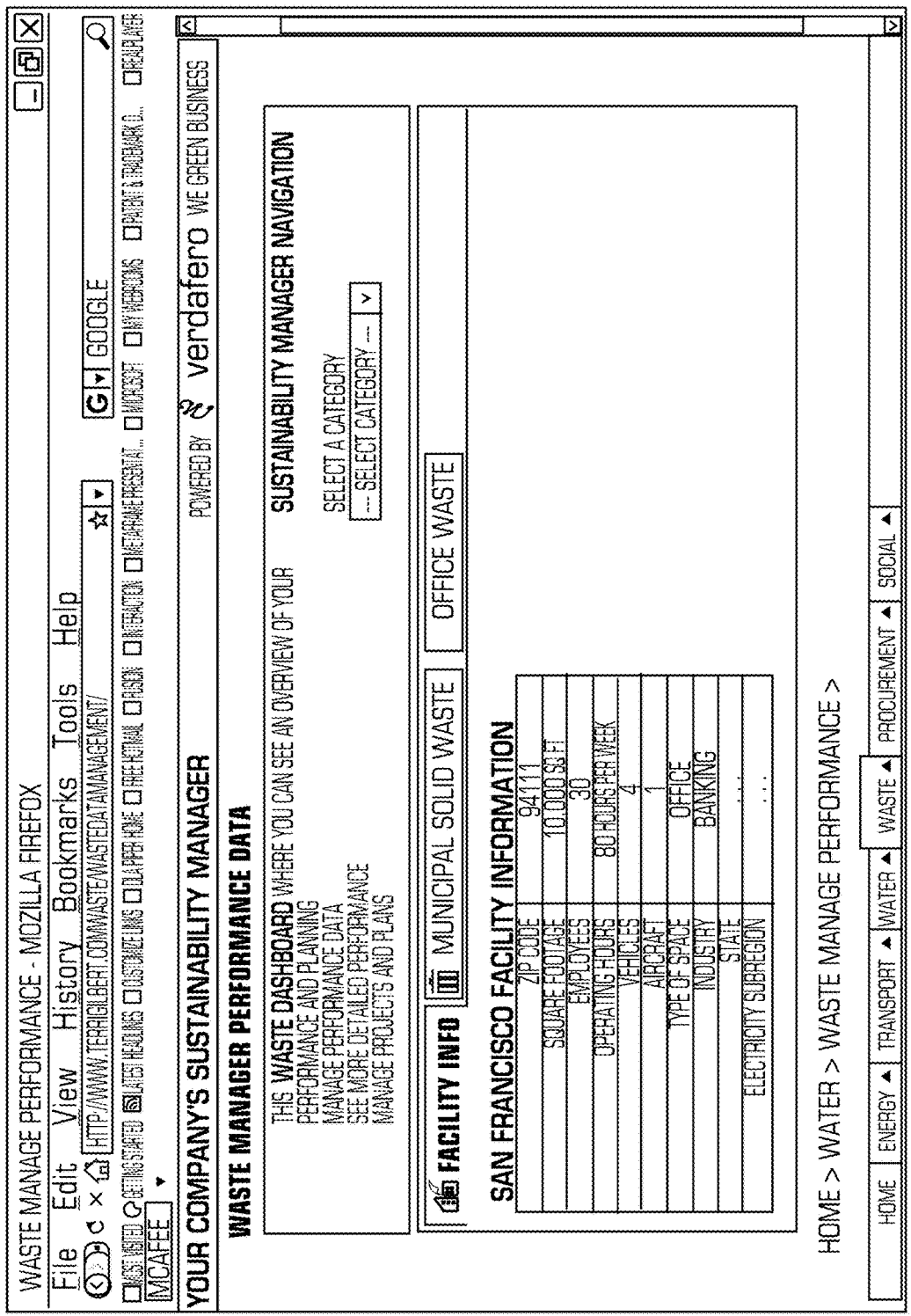
FIGS. 13A-13C illustrate an example of waste sustainability user interfaces of the sustainable business development management system.
Figure 13B:
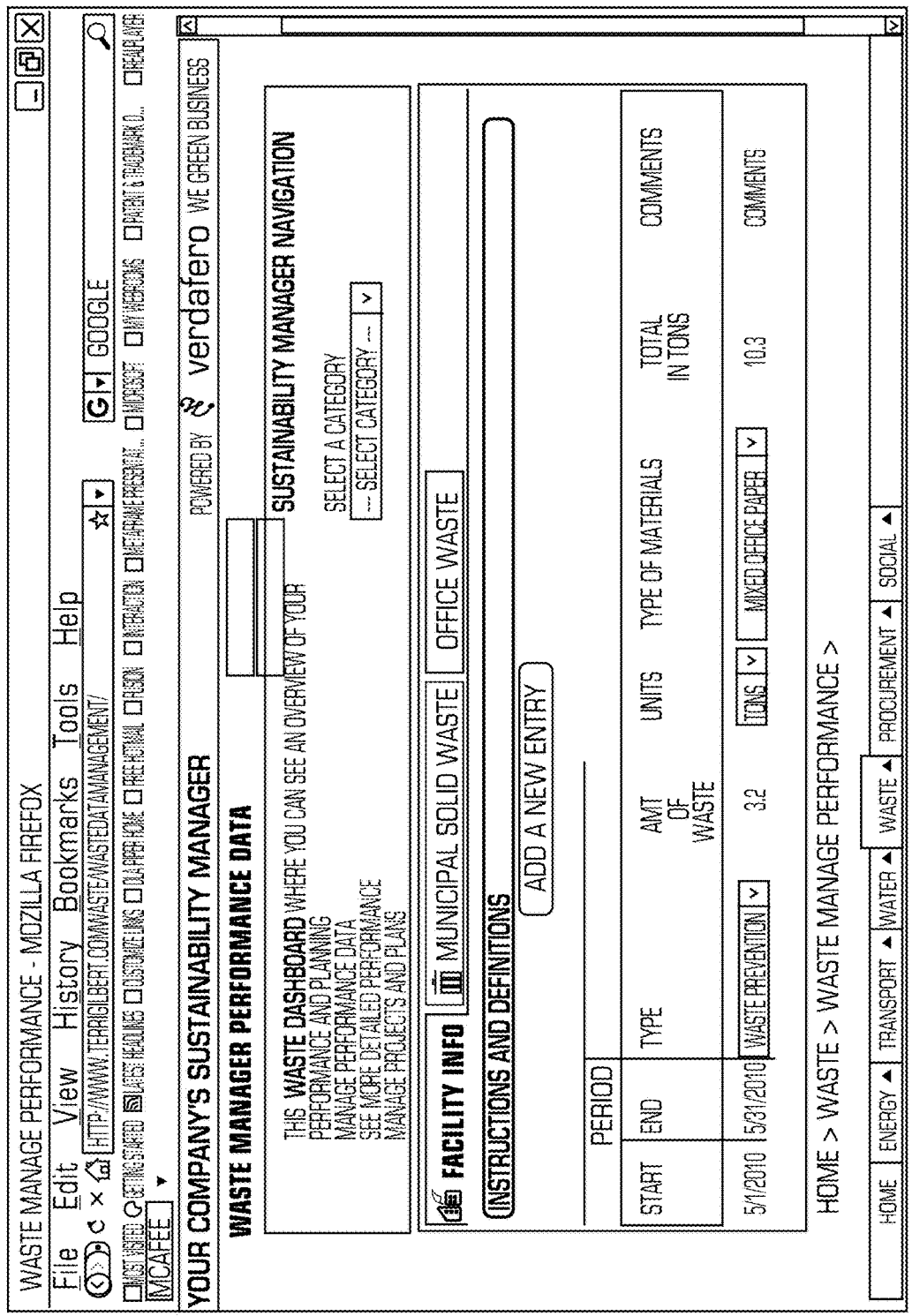
Figure 13C:
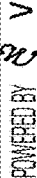

FIGS. 13A-13C illustrate an example of waste sustainability user interfaces of the sustainable business development management system. The waster sustainability user interfaces may include a manage performance user interfaces as shown in FIGS. 13A and 13B and a waste detailed user interface as shown in FIG. 13C.

Figure 14:
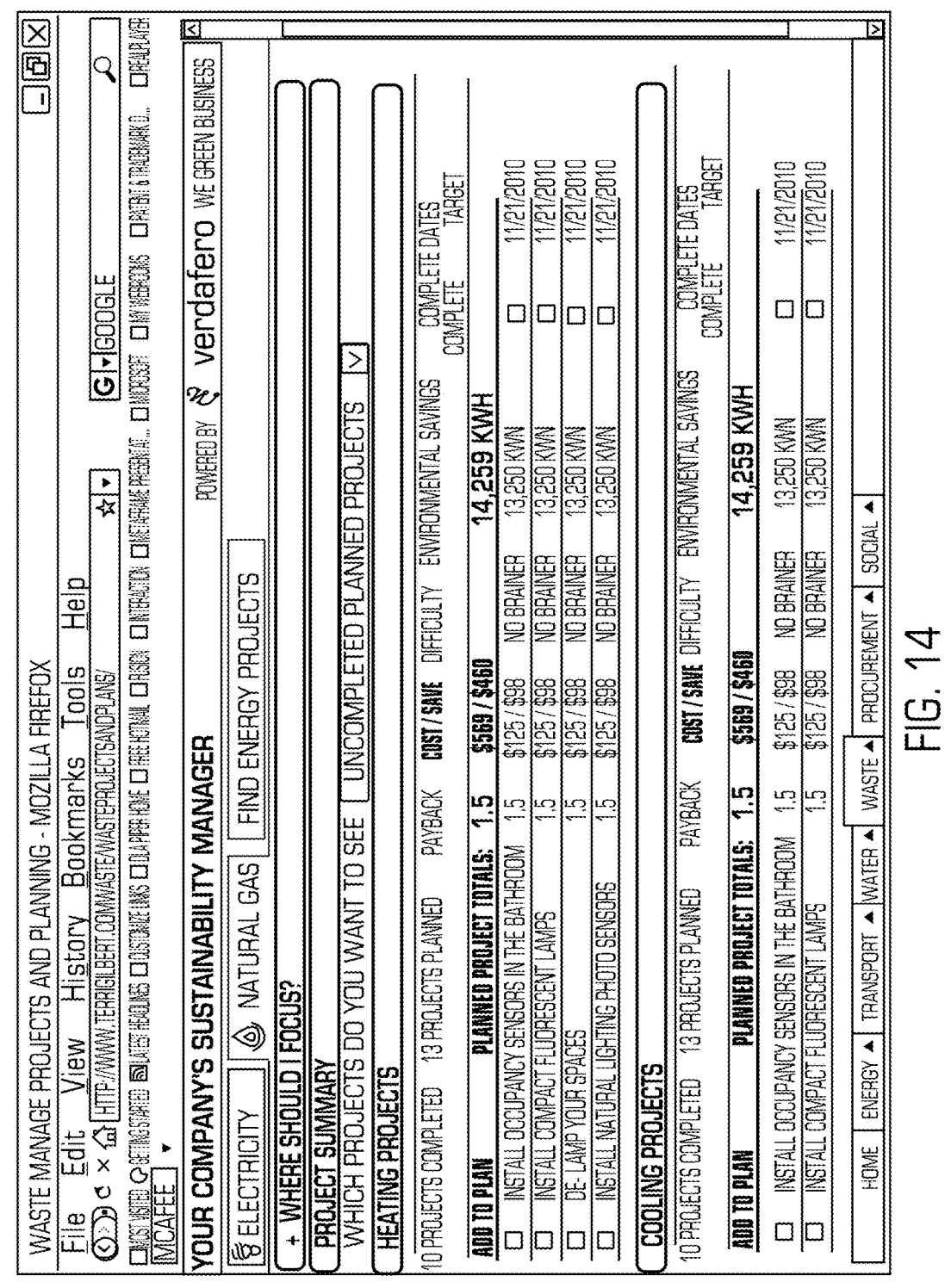

FIG. 14 illustrates an example of a projects summary user interface of the sustainable business development management system. This user interface allows the user to see each project (broken down by the type of project) and details of each project.

Figure 15A:
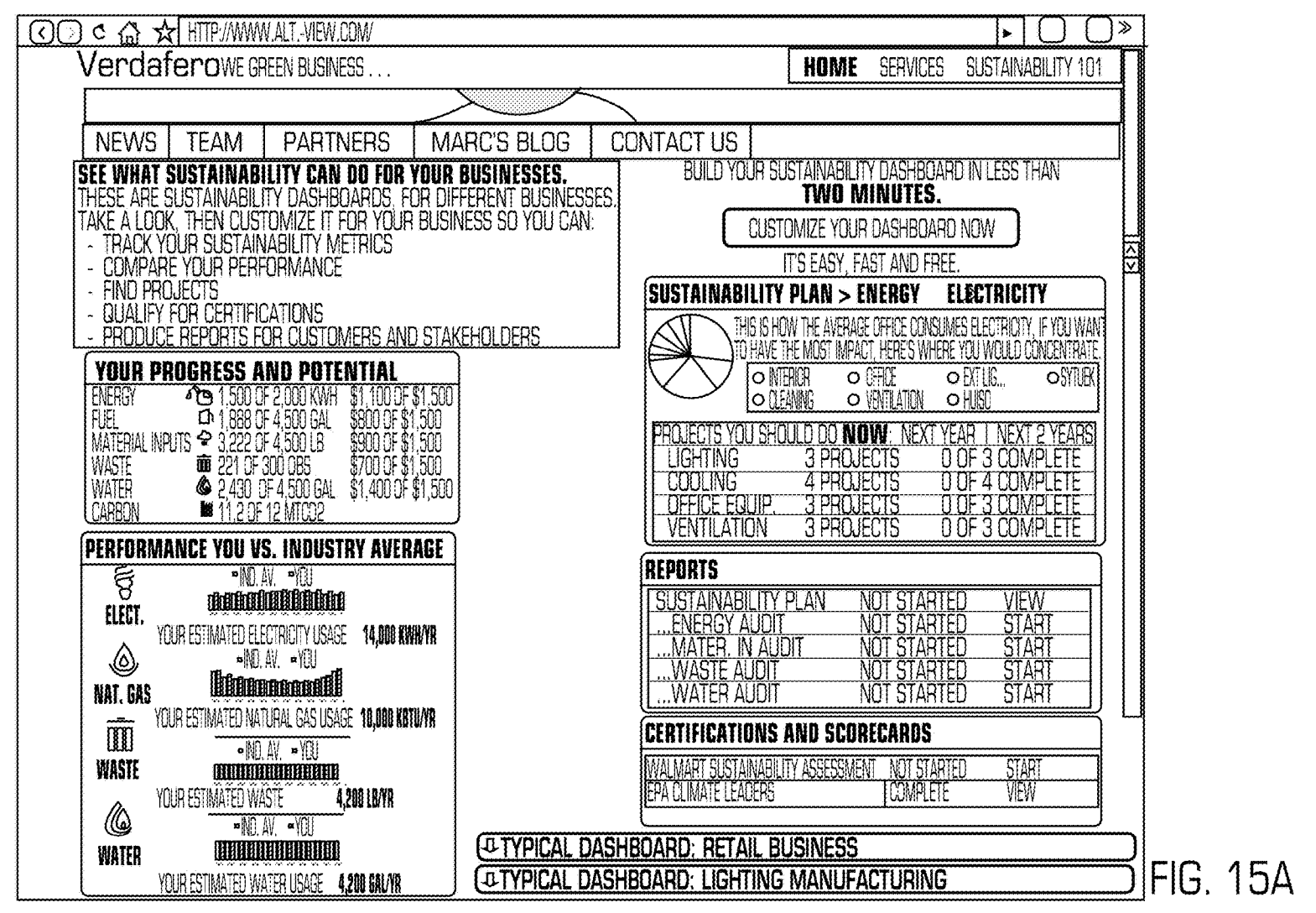
Figure 15B:
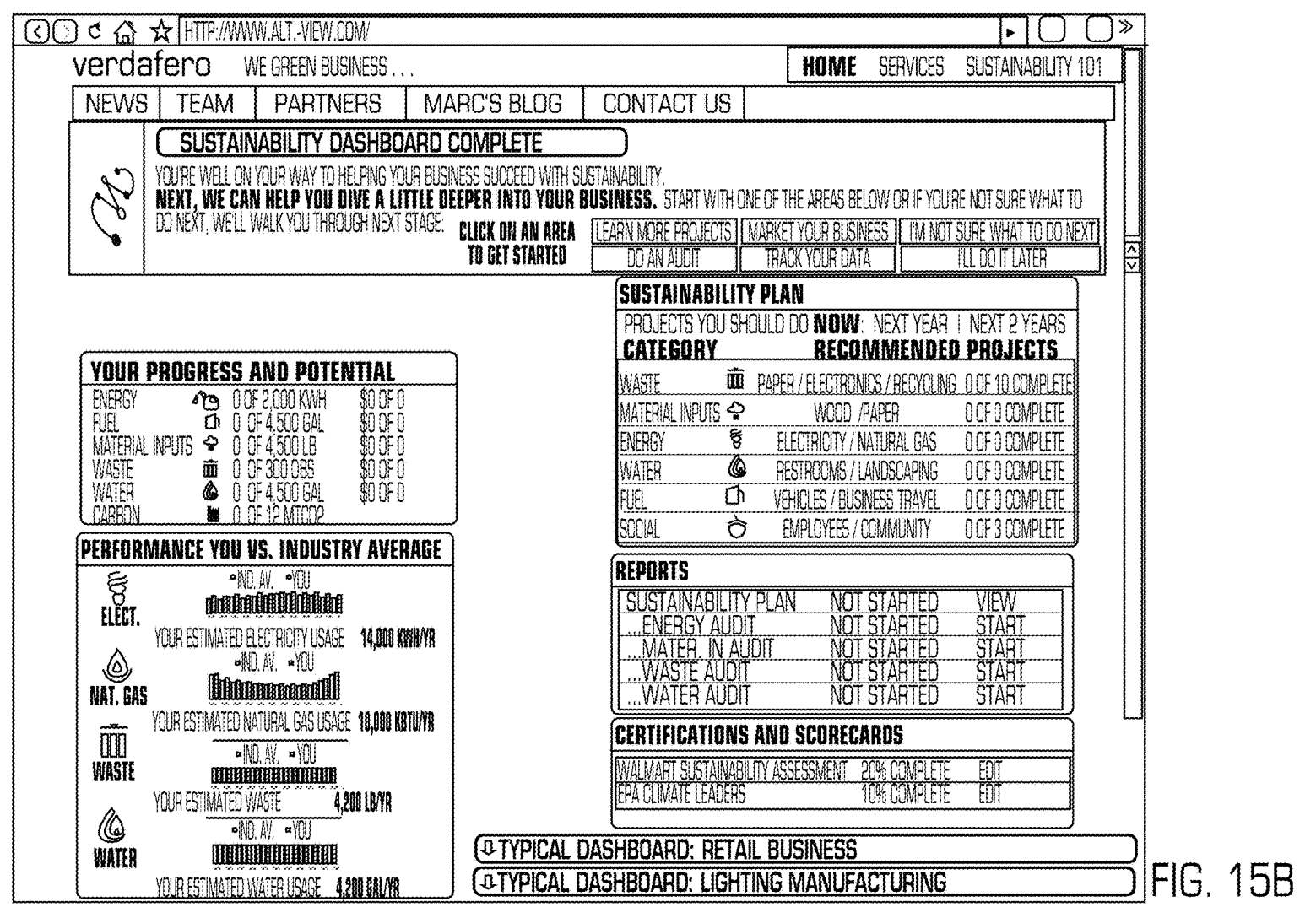
Figure 15C:
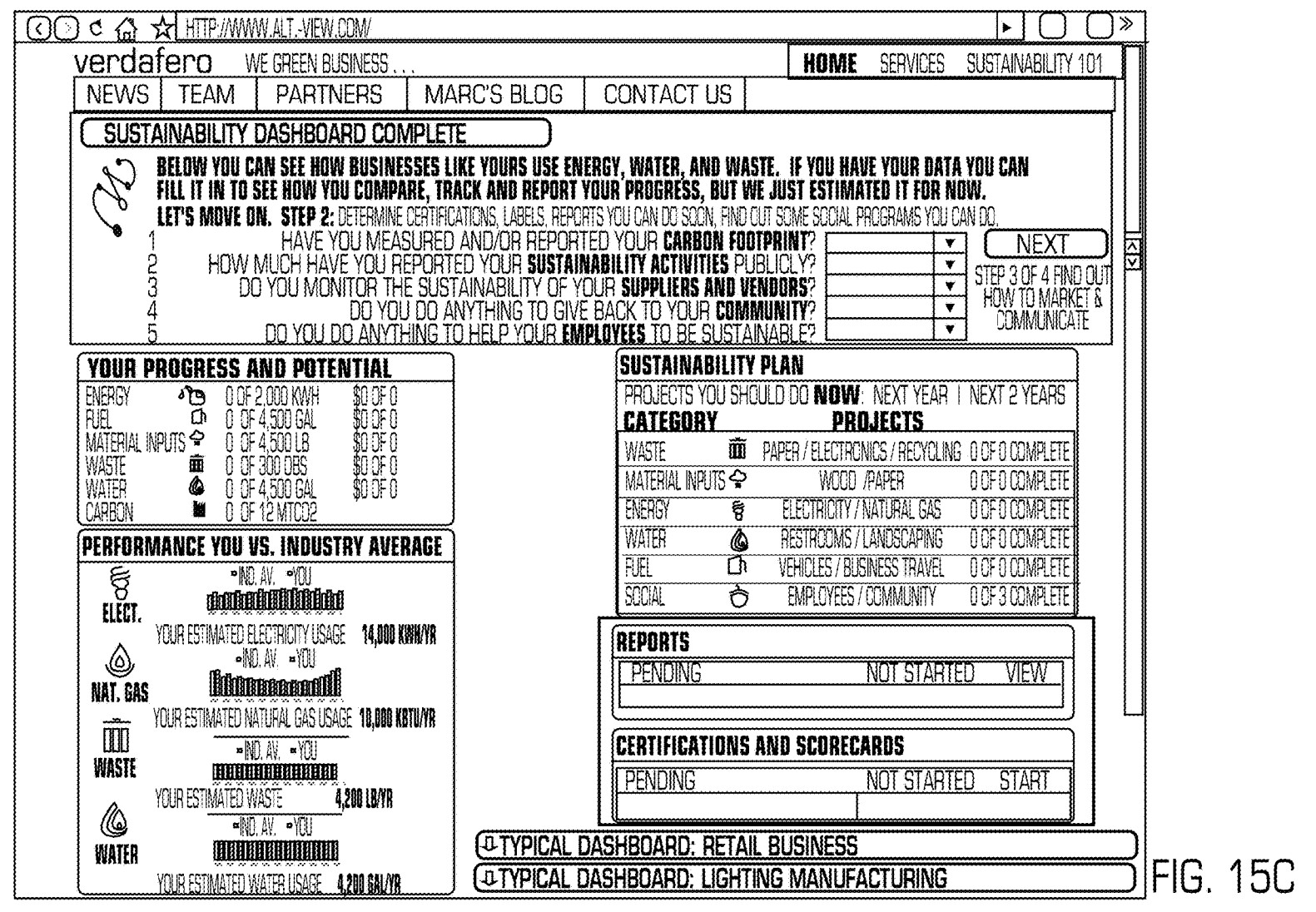
Figure 15D:
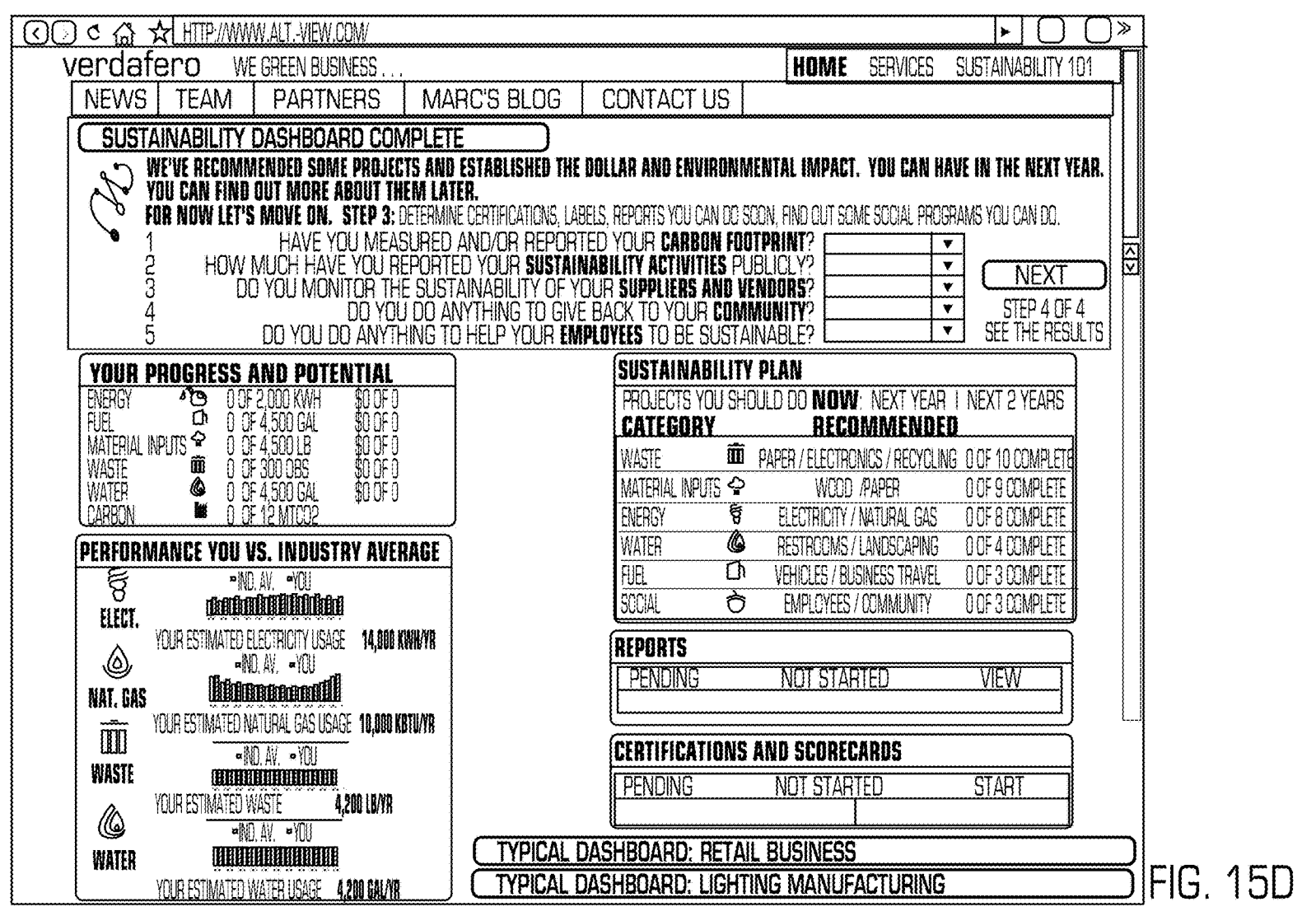
Figure 15E:
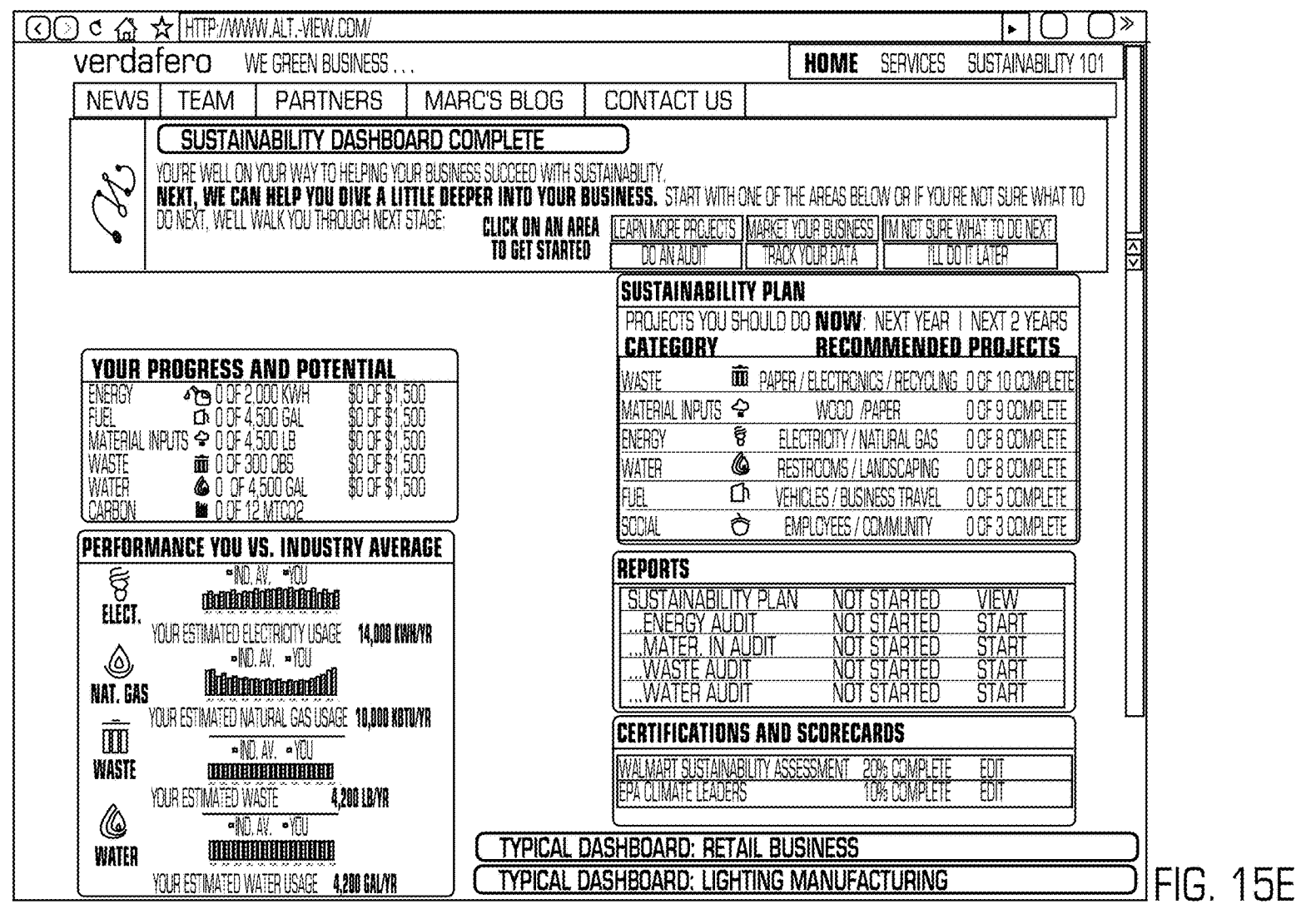

FIGS. 15A-E are examples of a sustainability dashboard generated by the sustainable business development management system and how the sustainability dashboard for a particular user is generated. As shown in FIG. 15A, the user is presented with example Sustainability Dashboard with sample data from a business in their particular industry. Each user is then asked questions about: the industry of the user; the type of buildings of the particular user, the number of employees of the particular user; the total square footage of the buildings of the particular user and whether company owns/operates vehicles. FIGS. 15B-15E illustrate illustrates other user interfaces that are used by the system is generate the sustainability dashboard for the particular user.

Once the user has entered the basic information above, the user is presented a sample performance dashboard that shows average estimated monthly natural gas usage and cost that is calculated based on: Industry and type of space, Square footage, Number of employees and Location. In addition, the average estimated monthly electricity usage and cost is calculated based on: Industry and type of space, Square footage, Number of employees and Location. The average estimated waste generated is estimated based on: type of space and number of employees and the average water usage and cost estimated based on: number of employees, industry and location.

The user is then asked questions to assess the amount their business has done to reduce their environmental impact including actions taken to reduce energy usage, actions taken to reduce water usage, actions taken to reduce material inputs, actions taken to improve process efficiencies, actions taken to reduce waste and actions taken to reduce fuel and transportation. For each question, the user provides qualitative assessment of how much they have done(nothing, a little, some actions, a lot). Based on answers to questions about actions they've taken, user is presented with sample sustainability planning dashboard that has a set of projects in areas of electricity, water, waste, natural gas and transport are recommended based on: answers to qualitative assessment of actions already taken, industry and type of space.

The user is then asked questions to assess type of reporting and tracking they have done of environmental performance including: reporting to third party organizations, voluntarily or as part of supplier requirements, reporting to customers and/or tracking of energy, water and waste. Based on answers to reporting questions, reports and certifications dashboard presented in which the user is shown certifications they might be eligible for based on industry and the user is shown additional information to be tracked to meet standards for reporting or certification.

The user is also shown a complete dashboard with information about average company of their size, industry, space type with sustainability indicators they should be tracking, certifications and reports they could produce, projects and planning they could undertake to improve performance and specific next steps they should take based on their goals including: reporting to customers or third parties, reducing environmental impact and making a sustainability plan.

Figure 16:
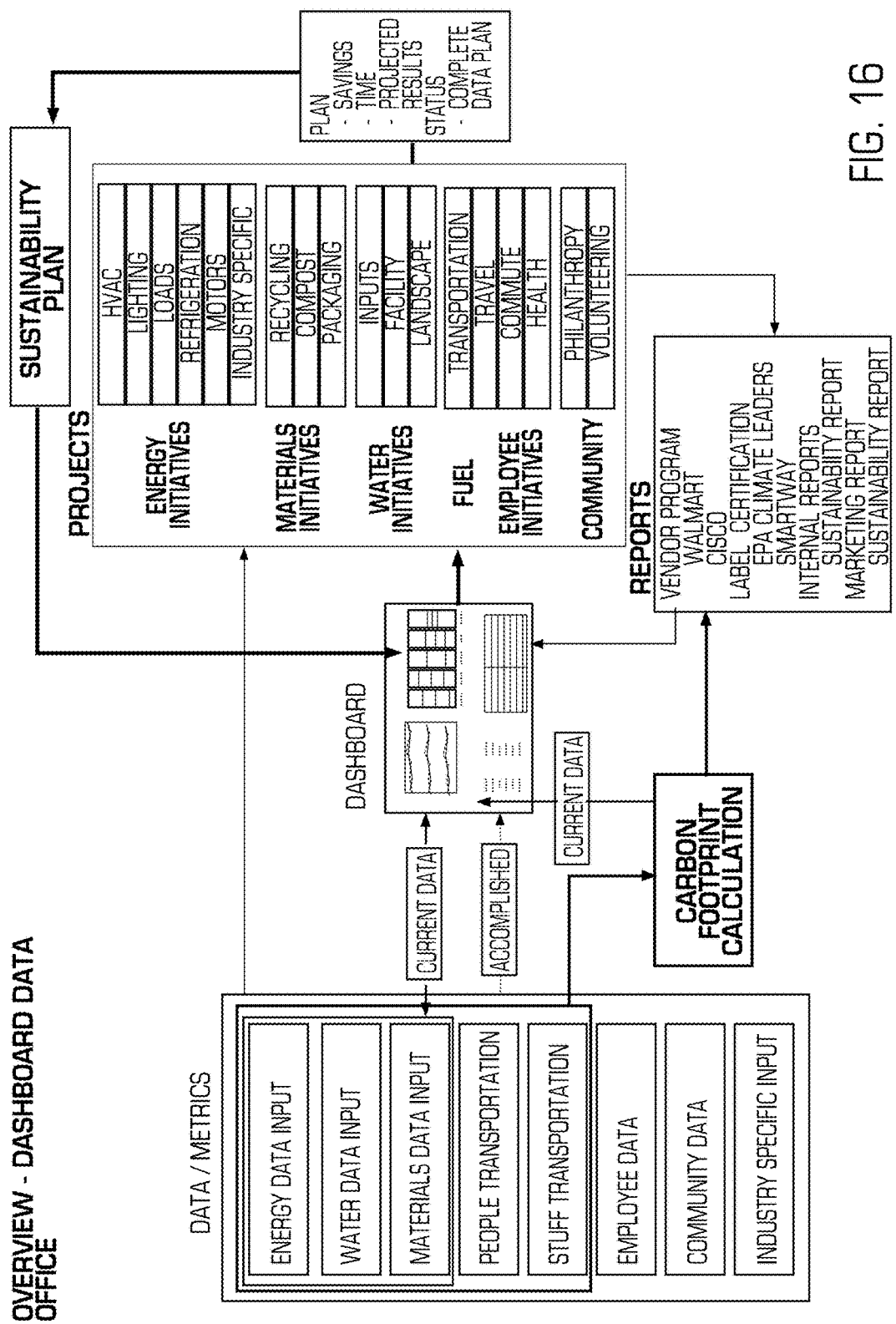
FIG. 16 illustrates a method for generating the dashboard.

FIG. 16 illustrates a method for generating the dashboard in which the various elements of the system (the data/metrics, the projects, the sustainability plan and reports are shown in relation to the dashboard.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A business sustainability system, comprising:
a plurality of computing devices;
a sustainable business development management unit that is capable of communicating with the plurality of computing devices over a link about energy, water, and waste data of a business associated with each computing device, the waste data of the business including soft plastics, shipping material, recycling, compost and landfill data;
the sustainable business development management unit having an application programming interface (API) that interfaces with the plurality of computing devices, a plurality of service providers and a plurality of meters for real time energy, water and waste data retrieval from the plurality of meters for the business to the sustainable business development management unit;
the sustainable business development management unit automatically captures, using the API, user profile data including energy, water and waste use by each business for an existing sustainable business development of each business and programmatically performs an analysis of the user profile data about the existing sustainable business development for each business to programmatically generate a set of recommended best practices for the existing sustainable business development of each business based on the analysis of the user profile data of each business, has an action planner that provides real-world actions and recommendations based on the set of recommended best practices and programmatically generates, for each business based on the user profile data for each business, two or more of an energy analysis report for the existing sustainable business development showing the energy usage for each business that is customized for each business based on the user profile data for each business and includes a display of energy projects of the existing sustainable business development for the business, a water analysis report for the existing sustainable business development showing the water usage for each business that is customized for each business based on the user profile data for each business and includes a display of water projects of the existing sustainable business development for each business and a waste analysis report for the existing sustainable business development showing the soft plastics, shipping material, recycling, compost and landfill for each business that is customized for each business based on the waste data for each business, the waste analysis report including an amount of the soft plastics, the shipping material, the recycling, the compost and the landfill over one or more different periods of times; and the sustainable business development management unit having a user interface component that displays to a user of the existing sustainable business development the energy analysis report for the existing sustainable business development, the water analysis report for the existing sustainable business development and the waste analysis report for the existing sustainable business development.

2. The system of claim 1, wherein the sustainable business development management unit generates the set of recommended best practices based on a return on investment.

3. The system of claim 2, wherein the set of recommended best practices are a prioritization of the recommendations.

4. The system of claim 1, wherein the set of recommended best practices are one of a list of recommended projects in a sustainability area and a link to a vendor for one of the recommended projects in the list.

5. The system of claim 1, wherein the sustainable business development management unit generates a report.

6. The system of claim 5, wherein the report is one of a sustainability report, a CO2 report, a certification report, a project report and a metrics report.

7. The system of claim 1 further comprising a marketplace for vendors to sell one of a product and a service for a sustainable business development project.

8. The system of claim 1, wherein the sustainable business development management unit is one of one or more server computers, a standalone computer, a mainframe and a downloadable application that is downloaded to the computing device.

9. The system of claim 1, wherein each computing device is one of a desktop computer, a laptop computer, a smartphone and a terminal computer.

10. The system of claim 9, wherein each computing device has a browser application.

11. The system of claim 9, wherein each computing device further comprises a downloadable application that interacts with the sustainable business development management unit.

12. A computer implemented business sustainability method using a plurality of computing devices and a sustainable business development management unit having a processor that is capable of communicating with the plurality of computing devices over a link, the method comprising:
automatically capturing, by the processor of the sustainable business development management unit using an application programming interface (API) that interfaces with the plurality of computing devices and a plurality of service providers to retrieve from a plurality of meters in real time energy, water and waste data for a business, user profile data for the business associated with each computing device about an existing sustainable business development of the business that includes real-time energy, water and waste of the existing sustainable business development from the plurality of meters, the waste including soft plastics, shipping material, recycling, compost and landfill data;
performing, by the processor of the sustainable business development management unit, an analysis of the user profile data of each business about the existing sustainable business development for each business;
generating, by the processor of the sustainable business development management unit, a set of recommended best practices for the existing sustainable business development of each business based on the analysis of the user profile data of each business;

programmatically generating, for each business based on the user profile data for each business, two or more of an energy sustainability report for the existing sustainable business development for each business that is customized for each business based on the user profile data for each business and includes a display of energy projects of the existing sustainable business development for the business, a water sustainability report for the existing sustainable business development for each business that is customized for each business based on the user profile data for each business and includes a display of water projects of the existing sustainable business development for the business and a waste sustainability report for the existing sustainable business development the soft plastics, shipping material, recycling, compost and landfill for each business that is customized for each business based on waste data for each business, the waste analysis report including an amount of the soft plastics, the shipping material, the recycling, the compost and the landfill over one or more different periods of times;

providing, by an action planner of the processor of the sustainable business development management unit, real-world actions and recommendations based on the set of recommended best practices; and displaying to a user of the existing sustainable business development the energy analysis report for the existing sustainable business development, the water analysis report for the existing sustainable business development and the waste analysis report for the existing sustainable business development.

13. The method of claim 12 further comprising generating, by the sustainable business development management unit, the set of recommended best practices based on a return on investment.

14. The method of claim 13, wherein the set of recommended best practices are a prioritization of the recommendations.

15. The method of claim 12, wherein the set of recommended best practices are one of a list of recommended projects in a sustainability area and a link to a vendor for one of the recommended projects on the list.

16. The method of claim 12 further comprising generating, by the sustainable business development management unit, a report.

17. The method of claim 16, wherein the report is one of a sustainability report, a CO2 report, a certification report, a project report and a metrics report.

* * * * *